United States Patent
Dudar

(10) Patent No.: US 10,471,966 B2
(45) Date of Patent: Nov. 12, 2019

(54) AMBIENT AIR TEMPERATURE SENSOR CORRECTION METHOD

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 15/665,253

(22) Filed: Jul. 31, 2017

(65) Prior Publication Data

US 2019/0031199 A1    Jan. 31, 2019

(51) Int. Cl.
| | |
|---|---|
| *B60W 50/00* | (2006.01) |
| *B60W 10/22* | (2006.01) |
| *B60W 10/30* | (2006.01) |
| *B60W 40/02* | (2006.01) |
| *B60W 50/02* | (2012.01) |
| *B60W 50/04* | (2006.01) |

(52) U.S. Cl.
CPC ........ *B60W 50/0098* (2013.01); *B60W 10/22* (2013.01); *B60W 10/30* (2013.01); *B60W 40/02* (2013.01); *B60W 50/0205* (2013.01); *B60W 50/04* (2013.01); *B60W 2050/021* (2013.01); *B60W 2050/041* (2013.01)

(58) Field of Classification Search
CPC .. B60W 50/0098; B60W 10/30; B60W 40/02; B60W 10/22; B60W 50/0205; B60W 50/04; B60W 2050/041; B60W 2050/021
See application file for complete search history.

(56) References Cited

U.S. PATENT DOCUMENTS

| | | | |
|---|---|---|---|
| 7,369,937 B1 | 5/2008 | Wang et al. | |
| 7,797,993 B2 | 9/2010 | Mc Lain et al. | |
| 8,608,374 B2 | 12/2013 | Hamama et al. | |
| 8,662,569 B2 | 3/2014 | Klop | |
| 8,825,308 B2* | 9/2014 | Nishimura | B60H 1/3208 180/68.1 |
| 9,114,796 B2 | 8/2015 | Martin et al. | |
| 9,476,345 B2* | 10/2016 | Styles | F01P 7/08 |
| 9,650,942 B2* | 5/2017 | Surnilla | F02B 29/04 |
| 2009/0078033 A1 | 3/2009 | Iwai | |
| 2010/0051712 A1* | 3/2010 | Lebeck | B60H 1/28 237/12.3 A |
| 2013/0338870 A1 | 12/2013 | Farmer et al. | |
| 2016/0368366 A1 | 12/2016 | Miller et al. | |
| 2017/0082045 A1* | 3/2017 | Makled | F02D 35/0007 |
| 2017/0120743 A1 | 5/2017 | Dudar | |
| 2017/0122239 A1 | 5/2017 | Li | |
| 2018/0293816 A1* | 10/2018 | Garrett | G07C 5/0808 |

\* cited by examiner

*Primary Examiner* — Russell Frejd
(74) *Attorney, Agent, or Firm* — Geoffrey Brumbaugh; McCoy Russell LLP

(57) ABSTRACT

Methods and systems are provided for conducting an ambient air temperature (AAT) sensor test. In one example, a method may include adjusting a vehicle actuator to reduce a deviation of the AAT measured by an AAT sensor on board a vehicle from an expected AAT and remeasuring the AAT with the AAT sensor in response to the AAT measured by the AAT sensor deviating from the expected AAT by more than a threshold temperature difference. In this way, excessively inflated or depressed AAT measurements at the AAT sensor can be reduced, the accuracy and the reliability of the AAT sensor measurements can be increased, vehicle fuel consumption and emissions can be reduced, and vehicle drivability can be increased.

16 Claims, 9 Drawing Sheets

AMBIENT AIR TEMPERATURE SENSOR CORRECTION METHOD

FIELD

The present description relates generally to methods and systems for operating a vehicle system to reduce temperature measurement errors associated with the ambient air temperature sensor.

BACKGROUND/SUMMARY

In most vehicles, ambient air temperature (AAT) sensors are employed to measure and display the outside air temperature to a vehicle operator. The measured air temperature is often utilized in engine controls and on-board diagnostics procedures. For example, fuel system leak test diagnostics may base test pass/fail thresholds at least partially upon the measured AAT. As another example, an engine controller may determine how much to enrich the air-to-fuel ratio based on the measured AAT. The AAT is often inferred and/or estimated by way of under hood temperature sensors. However, the measured AAT by AAT sensors can be inflated due to excessive radiant heat transferred to the AAT sensor from the engine, sun load, road surface, and the like. Similarly, the measured AAT by AAT sensors may be depressed due to snow or rain contacting the surface or the AAT sensor, and evaporative cooling of the contacting precipitation. Erroneous AAT measurements input to OBD and engine controls can reduce vehicle drivability, increase fuel consumption, and increase fuel emissions. Furthermore, displaying excessively inflated AAT at a vehicle instrument panel can be disconcerting to a vehicle operator.

One example approach of diagnosing a faulty temperature sensor is shown by Hamama et al. in U.S. Pat. No. 8,608,374. Therein, an outside air temperature (OAT) diagnostic system includes an ambient temperature monitoring module that receives an OAT signal from an OAT sensor and an intake air temperature (IAT) signal from an IAT sensor of an engine. The ambient temperature monitoring module compares the OAT signal to an IAT signal and generates a first difference signal. A performance reporting module determines whether the OAT sensor is exhibiting a fault and generates an OAT performance signal based on the first difference signal. Other attempts to address faulty vehicle ambient temperature sensors include Martin et al. U.S. Pat. No. 9,114,796. Therein, an engine temperature is compared to each of an intake air temperature sensed before an engine start but after sufficient engine soak, as well as an intake air temperature sensed after selected vehicle operating conditions have elapsed since the engine start. Based on discrepancies between the air temperature and the engine temperature, degradation of the sensor is determined.

The inventors herein have recognized potential issues with such systems. As one example, the above-mentioned approaches fail to detect erroneous ambient temperature measurements caused by excessive radiant heat transferred to the AAT sensor from solar load, the engine, the road surface, and the like. Similarly, the above-mentioned approaches fail to detect erroneous ambient temperature measurements caused by precipitation of snow or rain contacting the AAT sensor and evaporative cooling of the contacting precipitation. Furthermore, a method for reducing the radiant heat transferred to the AAT sensor, reducing precipitation from contacting the AAT sensor, and for correcting the inflated or depressed AAT sensor measurements is not provided. As such, radiant heat loads at the AAT sensor may result in a false indication of a faulty AAT sensor.

In one example, the issues described above may be at least partially addressed by a method for a vehicle including an ambient air temperature (AAT) sensor, the method comprising, in response to an AAT measured by the AAT sensor deviating from an expected AAT by more than a threshold temperature difference, adjusting a vehicle actuator to reduce the deviation of the AAT measured by the AAT sensor from the expected AAT, and remeasuring the AAT with the AAT sensor after adjusting the vehicle actuator. In this way, radiant heat loads at the AAT sensor can be reduced, depressed AAT measurements at the AAT sensor can be reduced, and inflated or depressed AAT measurements by the AAT sensor can be corrected, thereby increasing an accuracy of the AAT sensor measurements, and reducing a risk of misidentifying a faulty AAT sensor. As one example, the remeasured AAT may deviate from the expected AAT by less than the threshold temperature difference because adjusting the vehicle actuator aids in insulating the AAT sensor from the radiant heat load or from a cooling source such as precipitation. As such, the integrity of OBD and engine control methods can be maintained, thereby reducing or maintaining fuel consumption, fuel emissions, and vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
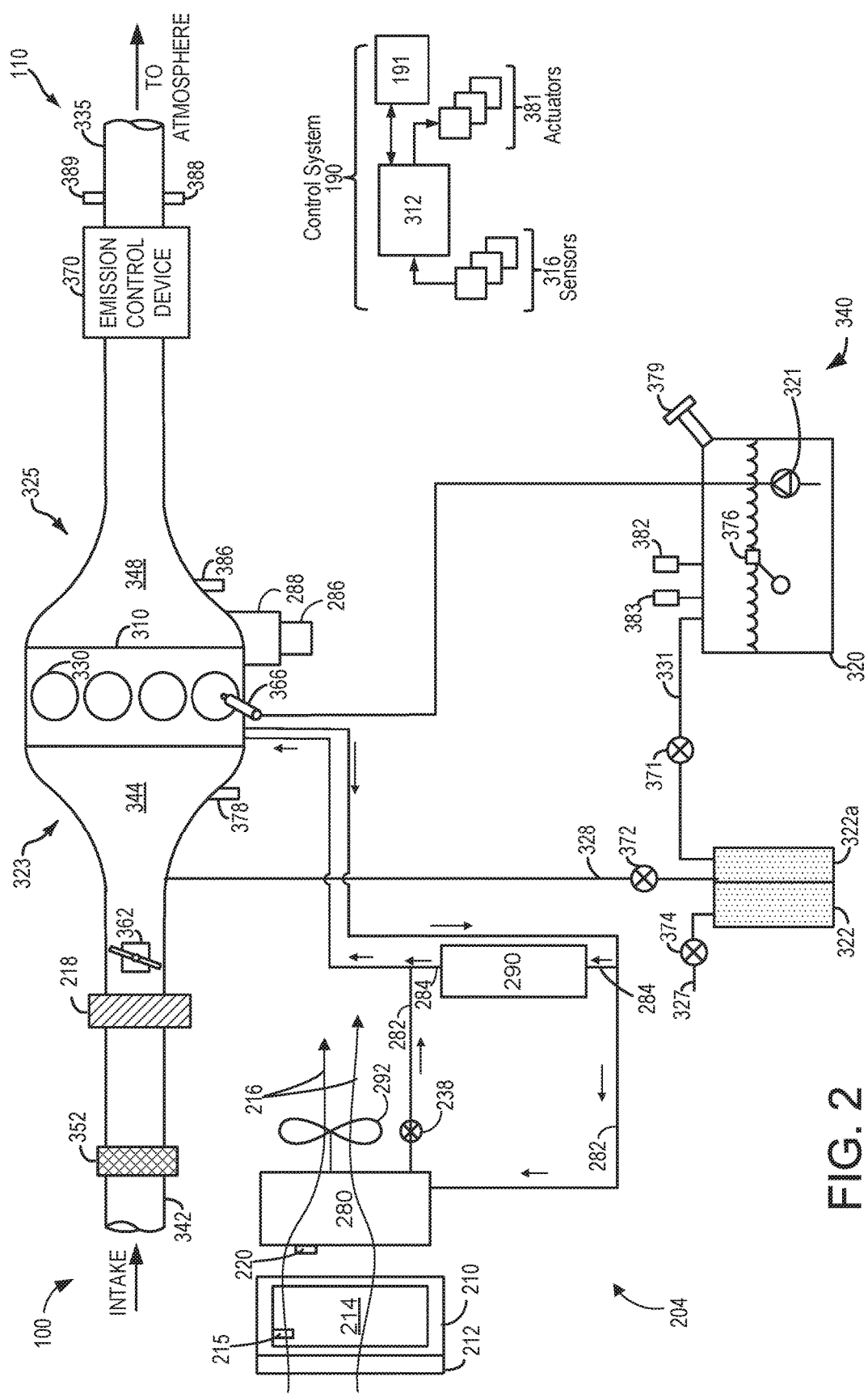
Figure 3:
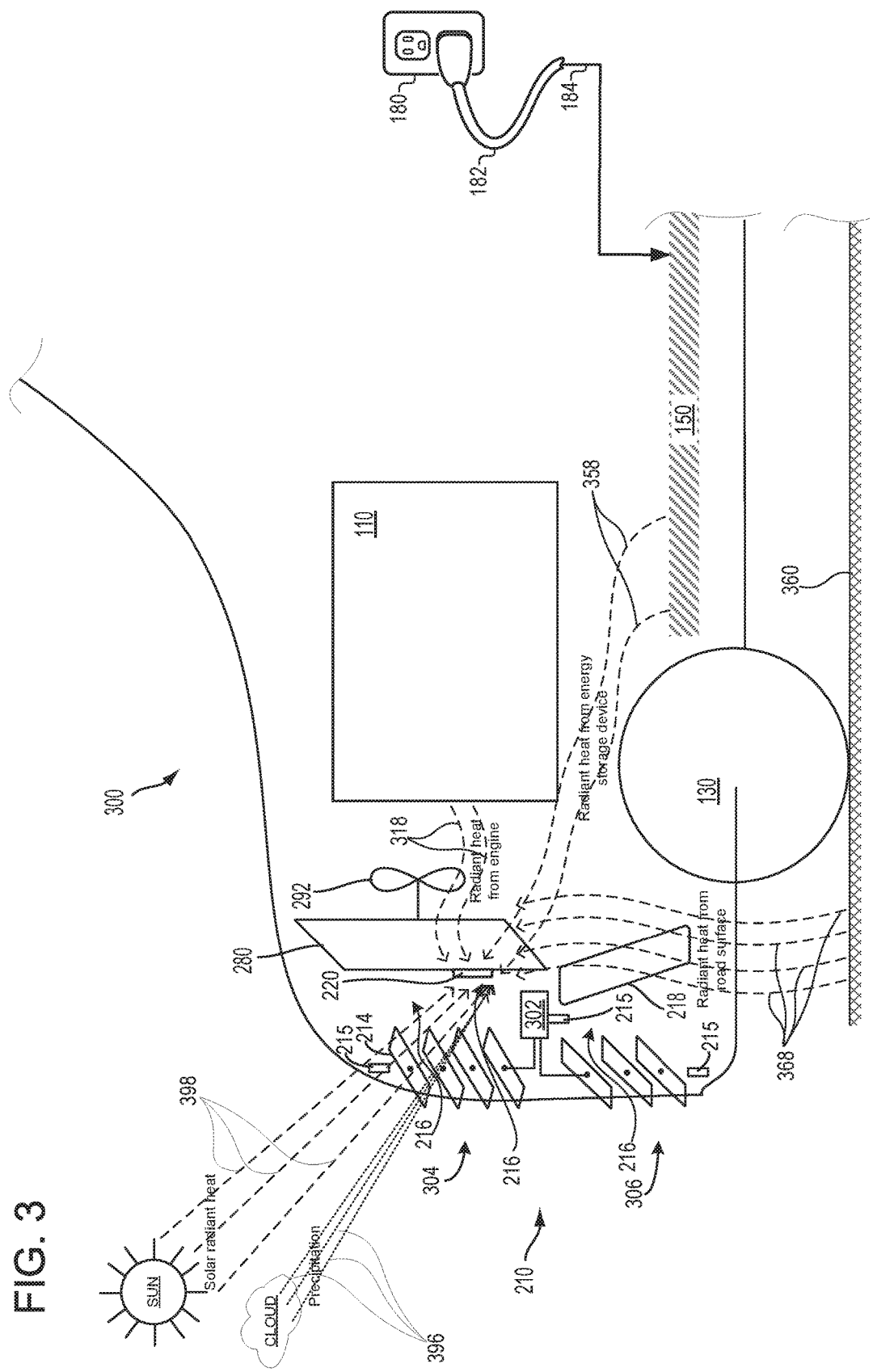
FIG. 3 illustrates a partial schematic of a vehicle system, including the vehicle propulsion system of FIGS. 1 and 2, and radiant heat and precipitation incident thereat.
Figure 4A:
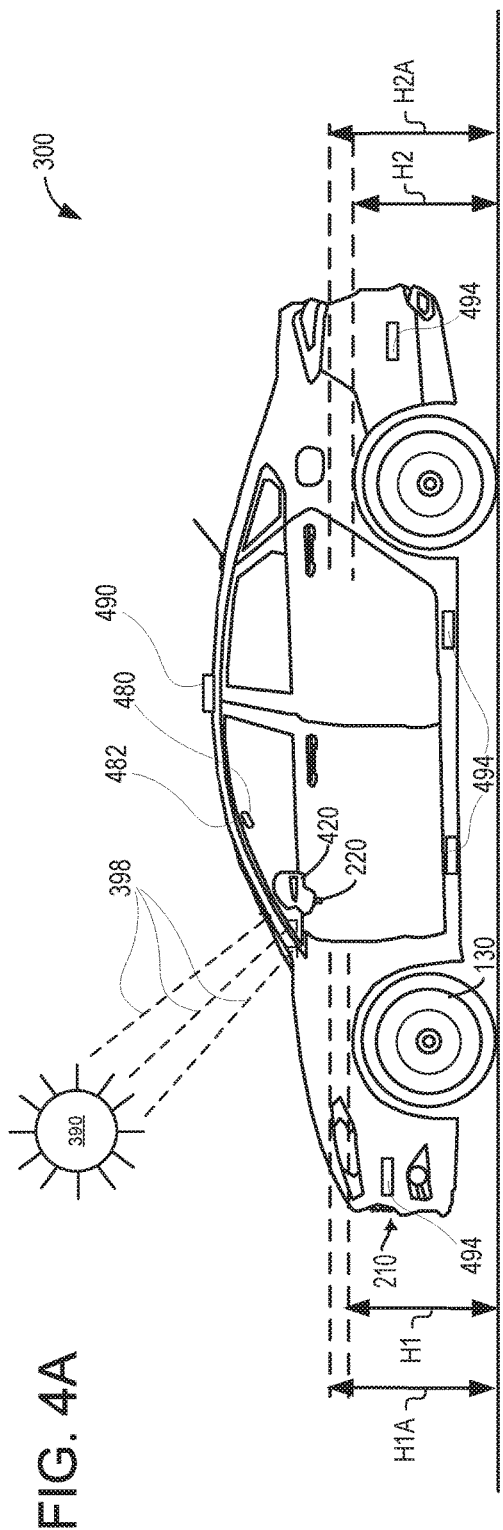
FIGS. 4A and 4B are schematics illustrating the vehicle system of FIG. 3, including the vehicle propulsion system of FIGS. 1 and 2.
Figure 4B:
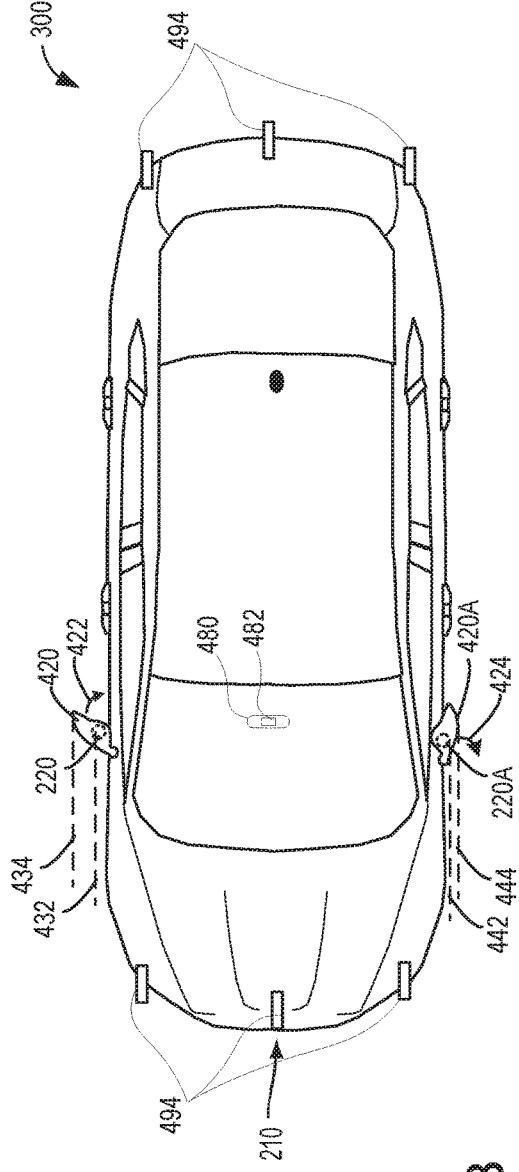
Figure 5:
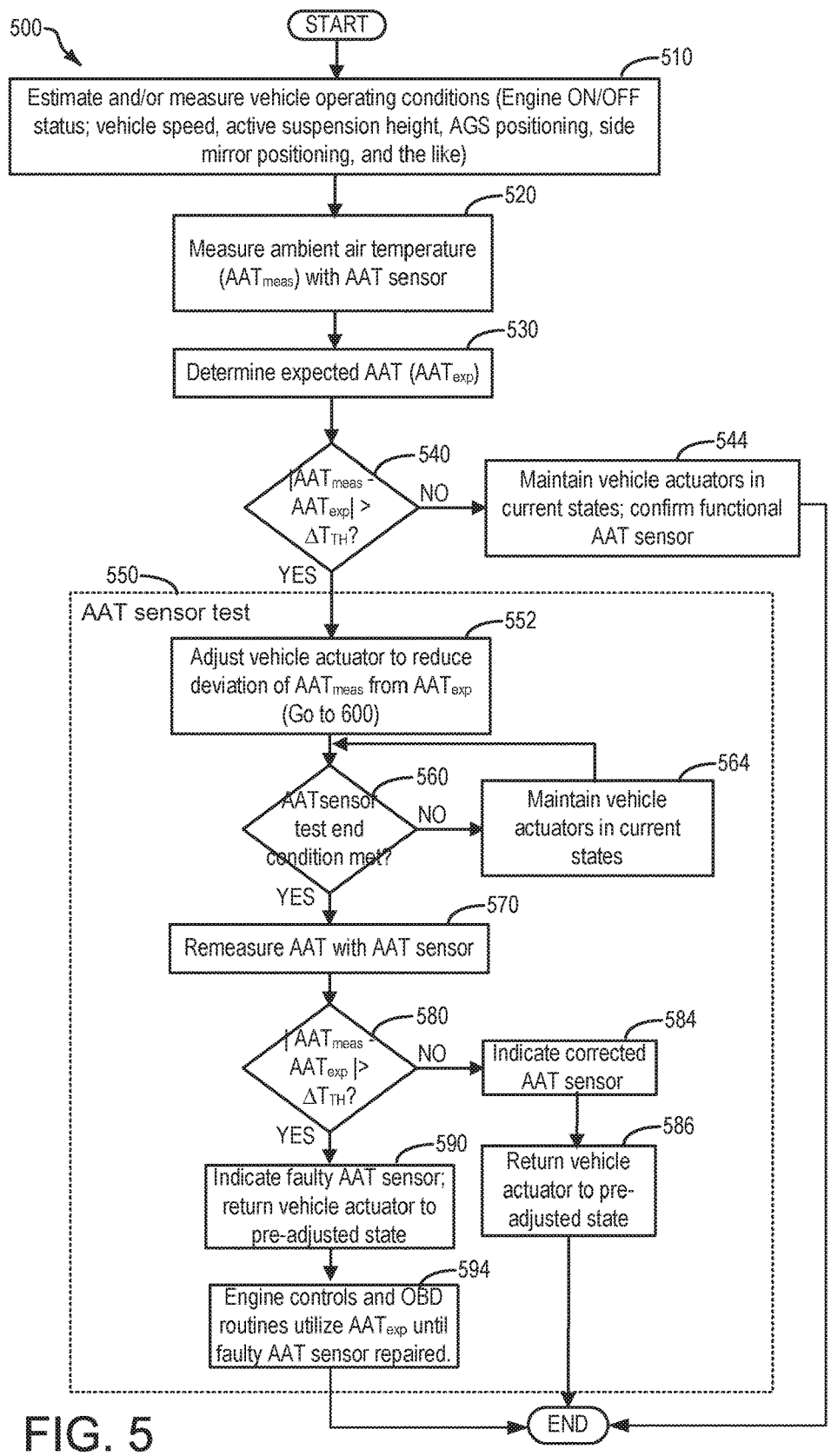
FIGS. 5, 6A, and 6B show flowcharts for example methods for operating the vehicle propulsion system of FIGS. 1 and 2.
Figure 6A:
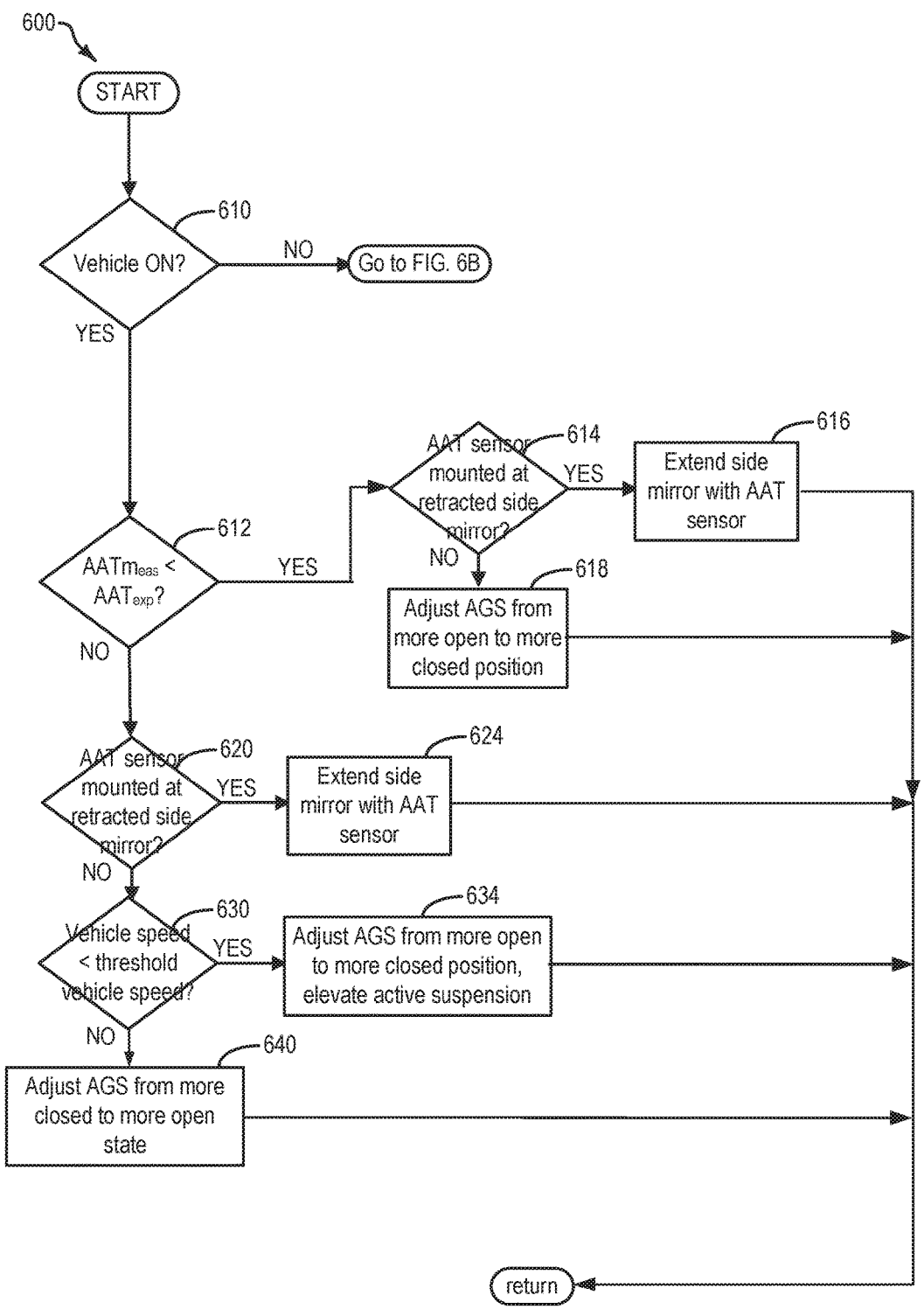
Figure 6B:
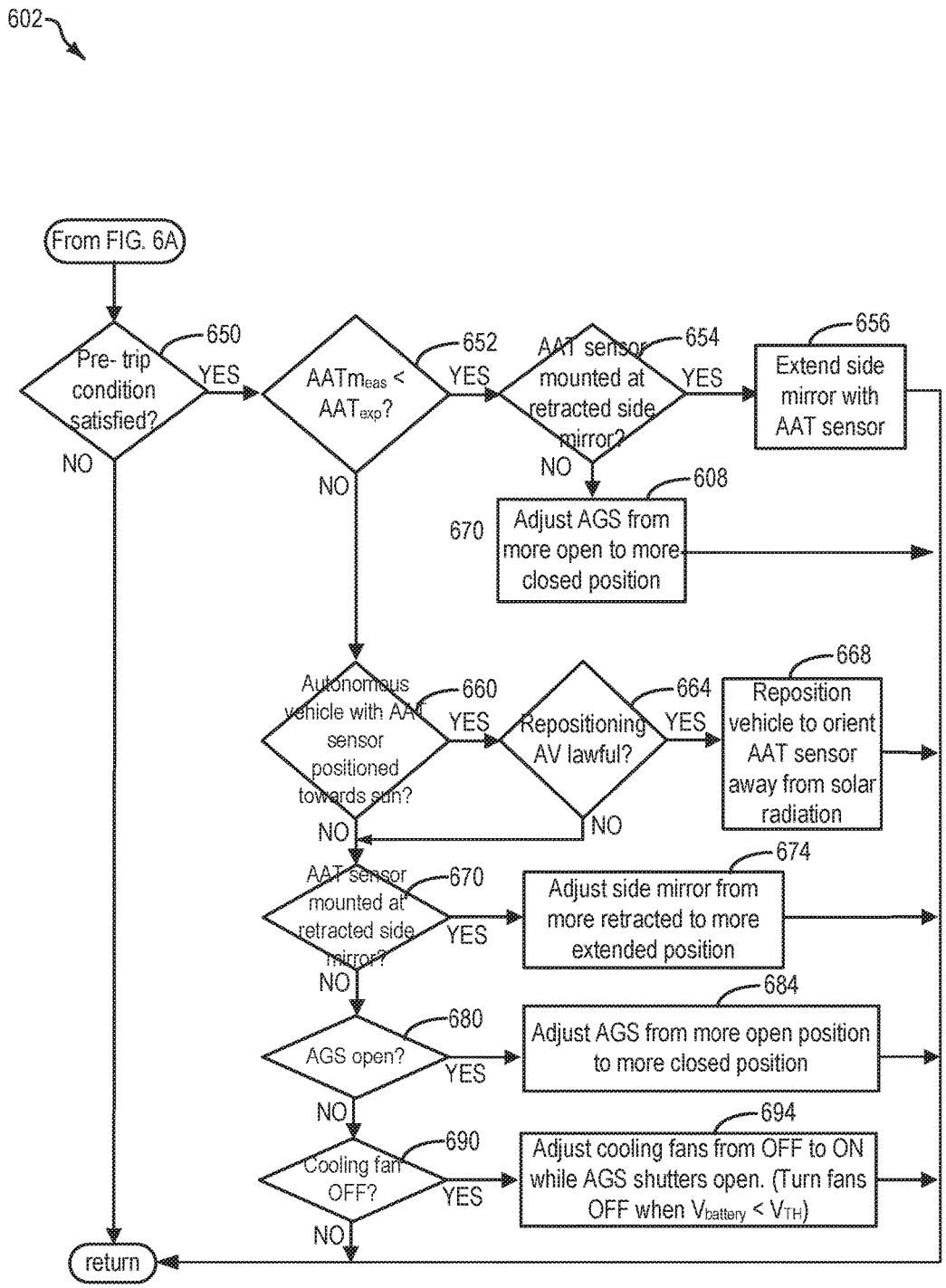
Figure 7:
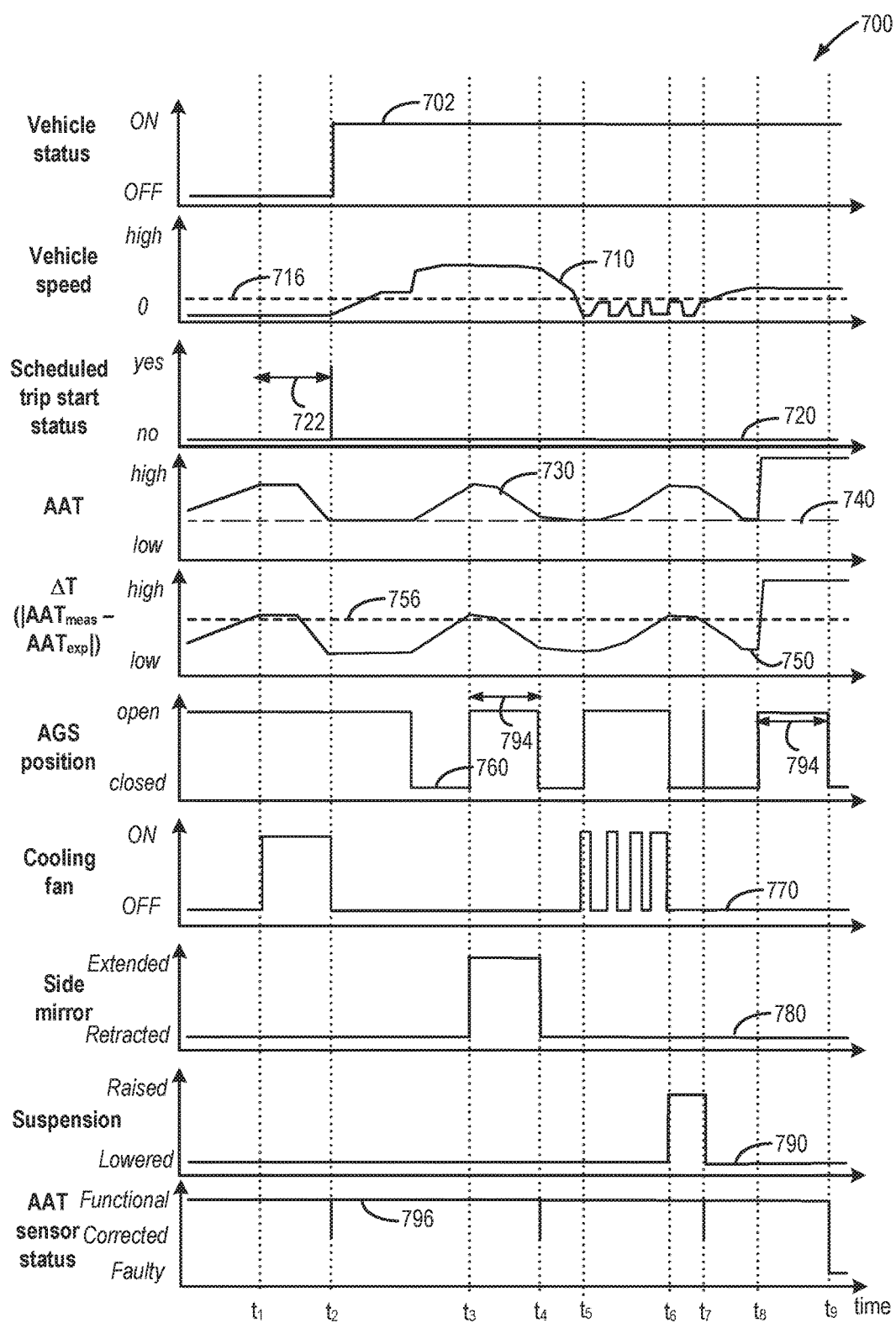
FIGS. 7 and 8 show example timelines for operating a vehicle propulsion system according to the methods depicted in FIGS. 5, 6A, and 6B.
Figure 8:
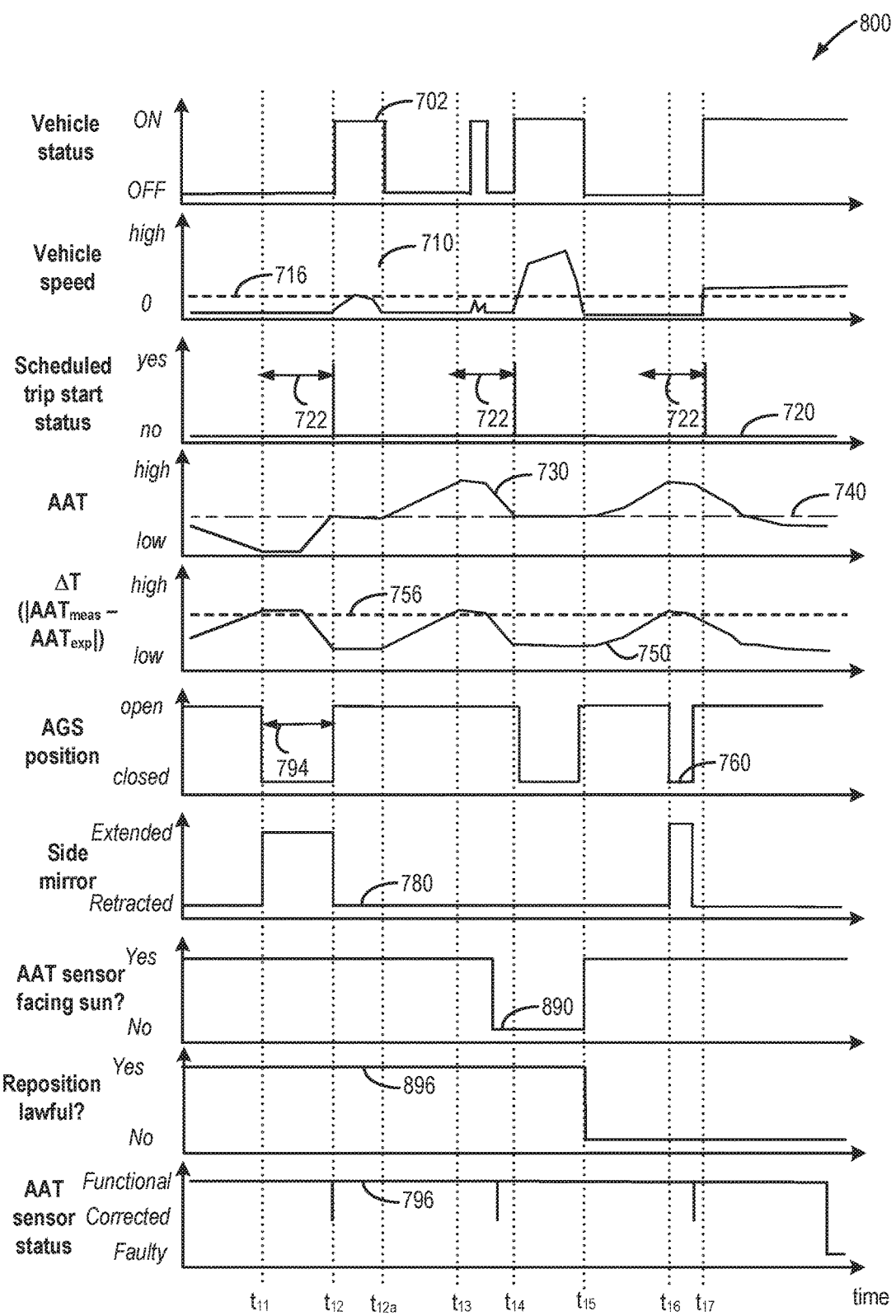

The following description relates to systems and methods for operating a vehicle system including conducting an ambient air temperature (AAT) sensor test to reduce temperature measurement errors associated with the ambient air temperature sensor. Specifically, the description relates to reducing a radiant heat load at an AAT sensor responsive to a measured AAT deviating from an expected AAT by more than a threshold amount. The system and methods may be applied to a vehicle system such as the vehicle system depicted in FIGS. 1 and 2. While the vehicle system depicted in FIG. 1 comprises a hybrid vehicle system, the illustration of a hybrid vehicle is not meant to be limiting, and the system and methods depicted herein may be applied to a non-hybrid vehicle without departing from the scope of the present disclosure. Further, in some examples, the vehicle may comprise an autonomous vehicle, where autonomous driving sensors may generate signals that help navigate the vehicle while the vehicle is operating in an autonomous (e.g., driverless) mode. The engine may be coupled to an emissions control system and fuel system and an engine cooling system, as depicted in FIG. 2. The engine cooling system may include a cooling fan, one or more groups of active grille shutters (AGS), and the under hood-mounted AAT sensor, as illustrated in FIG. 3. In some examples, the AAT sensor may additionally or alternately be mounted at an underside of one or more vehicle side mirrors, as shown in FIGS. 4A and 4B. The AAT sensor test may be performed responsive to a measured AAT deviating from an expected AAT by more than a threshold temperature difference. Performing the AAT sensor test may include adjusting a vehicle actuator to reduce a radiant heat transferred to the AAT sensor and remeasuring the AAT with the AAT sensor after adjusting the vehicle actuator. A detailed method for conducting the AAT sensor test procedure is shown in FIGS. 5, 6A, and 6B. Timelines for conducting the AAT sensor test method responsive to a measured AAT deviating from an expected AAT by more than a threshold temperature difference according to the method of FIGS. 5, 6A, and 6B, are depicted in FIGS. 7 and 8.

Figure 1:
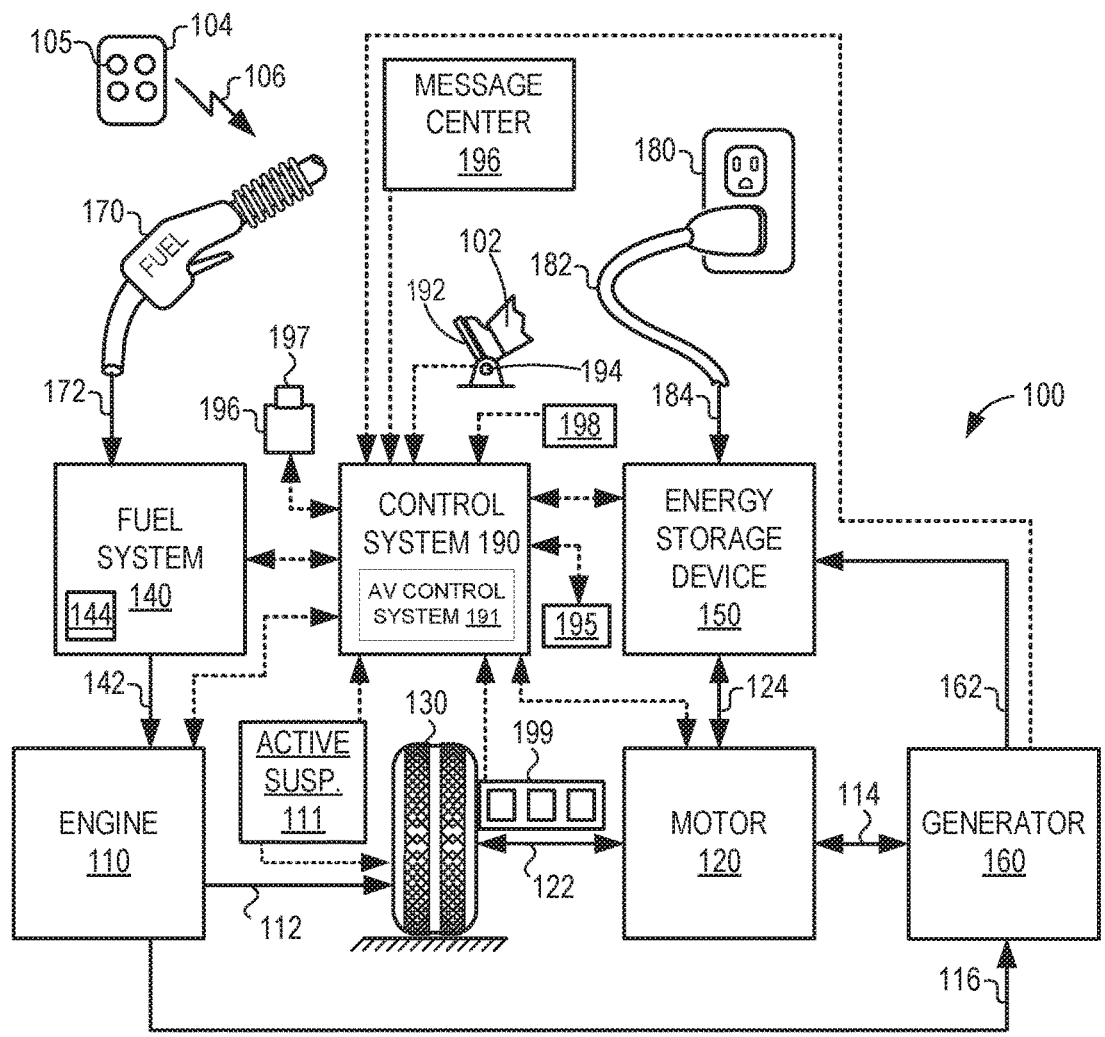
FIGS. 1 and 2 schematically show an example vehicle propulsion system.

Turning now to FIG. 1, it illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 340 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 340 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 340, energy storage device 150, and generator 160. For example, control system 190 may receive sensory feedback information from one or more of engine 110, motor 120, fuel system 340, energy storage device 150, and generator 160. Further, control system 190 may send control signals to one or more of engine 110, motor 120, fuel system 340, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

In the case of an autonomous vehicle (AV), operator 102 may be substituted prior to the start of or en route during a specified tip, by an autonomous vehicle control system 191, included within control system 190. In other words, the AV control system may provide indications and or requested output of the vehicle propulsion system 100 to the control system 190. Control system 190, in accordance with the AV control system requests, then actuates various vehicle actuators to propel the vehicle. In the case of an AV, the vehicle system 300 may include various devices for detecting vehicle surroundings, such as radar, laser light, GPS, odometry, and computer vision sensors. Advanced control systems, as part of the AV control system, may interpret sensory information to identify appropriate navigation paths, as well as obstacles and relevant signage (e.g., speed limits, traffic signals, and the like). The AV control system may further include executable instructions that are capable of analyzing sensory data to distinguish between different vehicles on the road, which can aid in planning a path to the desired destination. For example, the AV control system may include executable instructions to detect a type of roadway (e.g., one-way street, freeway, divided highway, and the like), or an available parking space (e.g., an empty space with enough clearance for the vehicle that is not prohibited based on time of day or loading zone, and the like). Furthermore, the AV control system 191 may include executable instructions to, in combination with sensory feedback, park a vehicle in a designated or detected available parking space.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 340 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and an active suspension system 111 that enables the control system 190 to regulate vertical positioning of the vehicle wheels 130 relative to the vehicle body. Active suspension system may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Vehicle propulsion system 100 may also include inertial sensors 199. Inertial sensors may comprise one or more of the following: longitudinal, latitudinal, vertical, yaw, roll, and pitch sensors. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows another schematic depiction of the vehicle propulsion system 100 including an engine system 110, fuel system 340, and cooling system 204 that may be included in vehicle propulsion system 100. An energy conversion device, such as a generator (not shown), may be operated to absorb energy from vehicle motion and/or engine operation, and then convert the absorbed energy to an energy form suitable for storage by the energy storage device.

Vehicle propulsion system 100 may include an engine 110 having a plurality of cylinders 330. Engine 110 includes an engine intake 323 and an engine exhaust 325. Engine intake 323 includes an air intake throttle 362 fluidly coupled to the engine intake manifold 344 via an intake passage 342. Air may enter intake passage 342 via air filter 352. Engine exhaust 325 includes an exhaust manifold 348 leading to an exhaust passage 335 that routes exhaust gas to the atmosphere. Engine exhaust 325 may include one or more emission control devices 370 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 110 is a boosted engine system, the engine system may further include a boosting device, such as a turbocharger (not shown).

Engine system 110 is coupled to a fuel system 340. Fuel system 340 includes a fuel tank 320 coupled to a fuel pump 321 and a fuel vapor canister 322. During a fuel tank refueling event, fuel may be pumped into the vehicle from an external source through refueling port 379. Fuel tank 320 may hold a plurality of fuel blends, including fuel with a range of alcohol concentrations, such as various gasoline-ethanol blends, including E10, E85, gasoline, etc., and combinations thereof. A fuel level sensor 376 located in fuel tank 320 may provide an indication of the fuel level ("Fuel Level Input") to controller 312. As depicted, fuel level sensor 376 may comprise a float connected to a variable resistor. Alternatively, other types of fuel level sensors may be used.

Fuel pump 321 is configured to pressurize fuel delivered to the injectors of engine 110, such as example injector 366. While only a single injector 366 is shown, additional injectors are provided for each cylinder. It will be appreciated that fuel system 340 may be a return-less fuel system, a return fuel system, or various other types of fuel system. Vapors generated in fuel tank 320 may be routed to fuel vapor canister 322, via conduit 331, before being purged to the engine intake 323.

Fuel vapor canister 322 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 322 may be purged to engine intake 323 by opening canister purge valve 372. While a single canister 322 is shown, it will be appreciated that fuel system 340 may include any number of canisters. In one example, canister purge valve 372 may be a solenoid valve wherein opening or closing of the valve is performed via actuation of a canister purge solenoid.

Canister 322 may include a buffer 322a (or buffer region), each of the canister and the buffer comprising the adsorbent. As shown, the volume of buffer 322a may be smaller than (e.g., a fraction of) the volume of canister 322. The adsorbent in the buffer 322a may be same as, or different from, the adsorbent in the canister (e.g., both may include charcoal). Buffer 322a may be positioned within canister 322 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 322 includes a vent 327 for routing gases out of the canister 322 to the atmosphere when storing, or trapping, fuel vapors from fuel tank 320. Vent 327 may also allow fresh air to be drawn into fuel vapor canister 322 when purging stored fuel vapors to engine intake 323 via purge line 328 and purge valve 372. While this example shows vent 327 communicating with fresh, unheated air, various modifications may also be used. Vent 327 may include a canister vent valve 374 to adjust a flow of air and vapors between canister 322 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 374 may be a solenoid valve wherein opening or closing of the valve is performed via actuation of a canister vent solenoid. In particular, the canister vent valve may be an open that is closed upon actuation of the canister vent solenoid.

As such, vehicle propulsion system 100 may have reduced engine operation times due to the vehicle being powered by engine system 110 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 371 may be optionally included in conduit 331 such that fuel tank 320 is coupled to canister 322 via the valve. During regular engine operation, isolation valve 371 may be kept closed to reduce the amount of diurnal or "running loss" vapors directed to canister 322 from fuel tank 320. During refueling operations, and selected purging conditions, isolation valve 371 may be temporarily opened, e.g., for a duration, to direct fuel vapors from the fuel tank 320 to canister 322. By opening the valve during purging conditions when the fuel tank pressure is higher than a threshold (e.g., above a mechanical pressure threshold of the fuel tank above which the fuel tank and other fuel system components may incur mechanical damage), the refueling vapors may be released into the canister and the fuel tank pressure may be maintained below pressure limits. While the depicted example shows isolation valve 371 positioned along conduit 331, in alternate embodiments, the isolation valve may be mounted on fuel tank 320.

One or more pressure sensors 382 may be coupled to fuel system 340 for providing an estimate of a fuel system pressure. In one example, the fuel system pressure is a fuel tank pressure, wherein pressure sensor 382 is a fuel tank pressure sensor coupled to fuel tank 320 for estimating a fuel tank pressure or vacuum level. While the depicted example shows pressure sensor 382 directly coupled to fuel tank 320, in alternate embodiments, the pressure sensor may be coupled between the fuel tank and canister 322, specifically between the fuel tank and isolation valve 371. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 383 may also be coupled to fuel system 340 for providing an estimate of a fuel system temperature. In one example, the fuel system temperature is a fuel tank temperature, wherein temperature sensor 383 is a fuel tank temperature sensor coupled to fuel tank 320 for estimating a fuel tank temperature. While the depicted example shows temperature sensor 383 directly coupled to fuel tank 320, in alternate embodiments, the temperature sensor may be coupled between the fuel tank and canister 322.

Fuel vapors released from canister 322, for example during a purging operation, may be directed into engine intake manifold 344 via purge line 328. The flow of vapors along purge line 328 may be regulated by canister purge valve 372, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 312, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 328 to prevent intake manifold pressure from flowing gases in the opposite direction of the purge flow. As such, the check valve may be utilized if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 378 coupled to intake manifold 344, and communicated with controller 312. Alternatively, MAP may be inferred from alternate engine operating conditions, such as mass air flow (MAF), as measured by a MAF sensor (not shown) coupled to the intake manifold.

Fuel system 340 may be operated by controller 312 in a plurality of modes by selective adjustment of the various valves and solenoids. For example, the fuel system may be operated in a fuel vapor storage mode (e.g., during a fuel tank refueling operation and with the engine not running), wherein the controller 312 may open isolation valve 371 and canister vent valve 374 while closing canister purge valve (CPV) 372 to direct refueling vapors into canister 322 while preventing fuel vapors from being directed into the intake manifold.

As another example, the fuel system may be operated in a refueling mode (e.g., when fuel tank refueling is requested by a vehicle operator), wherein the controller 312 may open isolation valve 371 and canister vent valve 374, while maintaining canister purge valve 372 closed, to depressurize the fuel tank before allowing enabling fuel to be added therein. As such, isolation valve 371 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 312 may open canister purge valve 372 and canister vent valve while closing isolation valve 371. Herein, the vacuum generated by the intake manifold of the operating engine may be used to draw fresh air through vent 327 and through fuel vapor canister 322 to purge the stored fuel vapors into intake manifold 344. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 322 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle propulsion system 100 may further include control system 190. Control system 190 is shown receiving information from a plurality of sensors 316 (various examples of which are described herein) and sending control signals to a plurality of actuators 381 (various examples of which are described herein). As one example, sensors 316 may include exhaust gas sensor 386 located upstream of the emission control device, temperature sensor 388, MAP sensor 378, pressure sensor 382, and pressure sensor 389. Other sensors such as additional pressure, temperature, air/fuel ratio, and composition sensors may be coupled to various locations in the vehicle propulsion system 100. As another example, the actuators may include fuel injector 366, isolation valve 371, purge valve 372, vent valve 374, fuel pump 321, and throttle 362.

In the case of an autonomous vehicle (AV), sensors 316 may further include various radar, laser light, GPS, odometry, LIDAR, and computer vision, and the like sensors for detecting a vehicle's surroundings. The AV control system 191 may receive input from one or more of these sensors 316 for identifying appropriate navigational paths. For example, light detection and ranging (LIDAR) sensory systems may provide accurate 3D information and characterization of the environment surrounding the vehicle, which may aid in object identification (e.g., vehicles, signs, pedestrians, and the like), motion vector determination, and collision prediction and avoidance strategies. In one example, the LIDAR sensory system 490 may include a rotating, scanning mirror assembly on top of the vehicle to provide a 360 degree view of this environment. Additionally, AVs may include additional detectors and digital cameras to increase a precision or resolution of the environment characterization. For more close-in control during parking, lane-changing, or high volume traffic environments, a plurality of radar sensors 494 may be positioned and integrated into the vehicle at the exterior perimeter of the vehicle on all sides. In one example, the LIDAR sensory system 490 combined with GPS, digital cameras, and/or other detectors may provide an indication to the controller 312 of a parking environment in the vicinity of the vehicle. For instance, the controller 312 may determine what parking spaces are empty, the parking spaces in which the vehicle can be lawfully parked (e.g., based on visible signage, traffic laws corresponding to GPS information, hazards and obstructions (e.g., fire hydrant, painted curb colors, other parked vehicles, and the like), the parking space environment (e.g., shaded by a building or tree, covered in a carport, and the like), and other information. Further circuitry within an AV may aid in power management, thermal dissipation, and other autonomous functions.

Control system 190 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 190 may further be configured to receive information via the internet or other communication networks. Information received from the GPS may be cross-referenced to information available via the internet to determine local weather conditions, local vehicle regulations, etc. Control system 190 may use the internet to obtain updated software modules which may be stored in non-transitory memory. Control system 190 may further include executable instructions stored thereon in non-transitory memory to store regularly scheduled vehicle trip routes and times. For example, regular routes, such as from home to work, home to school, and the like, may be stored in coordination with GPS mapping tools and with calendar scheduling tools. As such, the control system 190 may be able to schedule vehicle actions associated with pre-trip periods to increase vehicle drivability and passenger comfort by preparing or priming the vehicle conditions for the impending trip. For example, control system 190 may pre-heat passenger seats and a passenger compartment within the vehicle when the ambient air temperature is low, during a pre-trip period preceding (e.g., a short duration) prior to a regularly scheduled trip start. In another example, the vehicle may conduct various OBD tests during a pre-trip period prior to regularly scheduled trip starts to verify functional vehicle systems. For example, during the pre-trip period, the control system 190 may perform an ambient air temperature sensor test (as described below with reference to FIGS. 5, 6A, and 6B), to correct excessive ambient air temperatures measured by an ambient air temperature sensor 220. The pre-trip period may include a threshold pre-trip duration prior to a scheduled trip start. In one example, the threshold pre-trip duration may be several minutes preceding a regularly scheduled trip start, such as within 60 minutes of a scheduled trip start, within 30 minutes of a scheduled trip start, within 15 minutes of a scheduled trip start, or 10 minutes of a scheduled trip start.

The control system 190 may include a controller 312. Controller 312 may be configured as a conventional microcomputer including a microprocessor unit, input/output ports, read-only memory, random access memory, keep alive memory, a controller area network (CAN) bus, etc. Controller 312 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Furthermore, the controller 312 may receive and send signals from and to the AV control system 191, in the case of an autonomous vehicle system. An example control routine is described herein and with regard to FIGS. 5, 6A, and 6B.

Controller 312 may also be configured to intermittently perform leak detection routines on fuel system 340 (e.g., fuel vapor recovery system) to confirm that the fuel system is not degraded. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Leak tests performed while the engine is not running may include sealing the fuel system following engine shut-off and monitoring a change in fuel tank pressure. This type of leak test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for a system with no leaks, and/or for a system with leaks of a predetermined size. Following a vehicle-off event, as heat continues to be rejected from the engine into the fuel tank, the fuel tank pressure will initially rise. During conditions of relatively high ambient temperature, a pressure build above a threshold may be considered a passing test.

EONV tests are typically initiated based on an inferred amount of heat rejected into the fuel tank. The amount of heat rejected may be inferred based on engine temperature, driving distance, total air mass entering the engine, etc. However, engines capable of operating in a deceleration fuel shut off mode may meet distance and/or air mass thresholds for initiating the EONV test while failing to generate and reject enough heat to robustly execute the test. Further, variable displacement engines may generate less heat than an engine operating with all cylinders constantly active. For VDEs, inferring the amount of heat rejected using the same standards for full displacement engines may lead to false failures, as the fuel tank pressure/vacuum thresholds may not be reached during the testing durations.

Evaporative emissions detection routines may be intermittently performed by controller 312 on fuel system 340 and evaporative emissions control system 251 to confirm that the fuel system and/or evaporative emissions control system are not compromised. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. Evaporative emissions tests may be performed by an evaporative level check monitor (ELCM) 295 communicatively coupled to controller 312. ELCM 295 may be coupled in vent 227, between canister 222 and the atmosphere. ELCM 295 may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, fuel system degradation may be diagnosed. In another approach, the negative pressure may be applied by coupling the vacuum pump to canister vent line 227.

Vehicle propulsion system 100 further includes a cooling system 204 that circulates coolant through internal combustion engine 110 to absorb waste heat and distributes the heated coolant to radiator 280 and/or heater core 290 via coolant lines 282 and 284, respectively. In particular, FIG. 2 shows cooling system 204 coupled to engine 110 and circulating engine coolant from engine 110 to radiator 280 via engine-driven water pump 286, and back to engine 110 via coolant line 282. Engine-driven water pump 286 may be coupled to the engine via front end accessory drive (FEAD) 288, and rotated proportionally to engine speed via a belt, chain, and the like. Specifically, engine-driven water pump 286 circulates coolant through passages in the engine block, engine head, and the like, to absorb engine heat, which is then transferred via the radiator 280 to ambient air. In an example where engine-driven water pump 286 is a centrifugal pump, the pressure (and resulting flow) produced at the engine-driven water pump outlet may be proportional to the crankshaft speed, which in the example of FIG. 2, is directly proportional to engine speed. In another example, a motor-controlled pump may be used that can be adjusted independently of engine rotation. The temperature of the coolant (e.g., engine coolant temperature, ECT) may be regulated by a thermostat valve 238, located in the cooling line 282, which may be kept closed until the coolant reaches a threshold temperature.

At least one ambient air temperature (AAT) sensor 220 may be mounted under the hood of the vehicle and positioned between the radiator 280 and the AGS system 210 to measure AAT. In other words, the AAT sensor 220 may be interposed between the radiator 280 and the AGS system 210 such that the AAT sensor 220 is positioned anteriorly to the radiator 280 and posteriorly to the AGS system 210. AAT sensor 220 may be conductively coupled to the control system 190 to transmit the measured AAT to controller 312. The measured AAT may be used by the controller 312 as an input to infer or indicate the AAT for evaluating and conducting various on-board diagnostics (OBD) and other controller tasks including regulating air/fuel ratio, performing fuel system leak tests, and the like, as further discussed herein. The AAT measured by the AAT sensor 220 may also be displayed to the vehicle operator at vehicle instrument panel 196. As shown in FIG. 3, the AAT sensor 220 may be mounted behind and adjacent to one of multiple groups of AGS shutters 214. In other examples, multiple AAT sensors may be positioned between the radiator 280 and the AGS system 210 with one AAT sensor positioned behind each group of AGS shutters 214. AAT sensor(s) may further be mounted in other locations. For example, as shown in FIG. 4, an AAT sensor 220 may be mounted at the underside of one or more side view mirrors 420 of the vehicle 300.

In addition to being measured by the AAT sensor 220, the ambient air temperature may be estimated from other temperature sensors on board the vehicle 300 and external data sources. For example, control system 190 may wirelessly communicate to a weather cloud data source to receive current and forecasted weather data such as ambient air temperature, humidity, wind speed, wind direction, solar intensity, cloud cover, and the like from various sources such as a weather cloud station, weather internet sites, and the like. Furthermore, control system 190 may wirelessly receive ambient air temperature data from real-time crowd sourced vehicle data. In this way data from one or multiple external sources may be aggregated (e.g., averaged, weight-averaged, and the like) to infer or predict an expected ambient air temperature, $AAT_{exp}$, at any given time or location of the vehicle. Controller 312 may compare the expected AAT to the measured AAT by the AAT sensor 220 to evaluate if radiant heat is unduly influencing the AAT sensor measurement or if the AAT sensor 220 may be faulty. For example, responsive to deviation of a measured AAT by the AAT sensor 220 from the expected AAT being greater than a threshold temperature difference, the control system 190 may perform an AAT sensor test, including adjusting a vehicle actuator to reduce radiant heat transferred to the AAT sensor 220. Adjusting the vehicle actuator can vary depending on the current vehicle operating conditions, as determined by the control system 190.

Engine system 110 may include an electric fan 292 for directing cooling airflow toward the charge air cooler (CAC) 218, cooling system 204, or other engine system components. In some embodiments, electric fan 292 may be an engine cooling fan. The engine cooling fan may be coupled to radiator 280 in order to maintain airflow through radiator 280 when vehicle 300 is moving slowly or stopped while the engine is running. Operating the engine cooling fan 292 to maintain airflow through the radiator 280 may also aid in reducing a measured AAT by the AAT sensor 220. Fan rotation speed or direction may be controlled by a controller 312. In one example, the engine cooling fan may also direct cooling airflow toward CAC 218. Alternatively, electric fan 292 may be coupled to the engine FEAD 288 and driven by the engine crankshaft. In other embodiments, electric fan 292 may act as a dedicated CAC fan. In this embodiment, the electric fan 292 may be coupled to the CAC 218 or placed in a location to direct airflow directly toward the CAC 218. In yet another embodiment, there may be two or more electric fans 292. For example, one may be coupled to the radiator (as shown) for engine cooling, while the other may be coupled elsewhere to direct cooling air directly toward the CAC 218. In this example, the two or more electric fans 292 may be controlled separately (e.g., at different rotation speeds) to provide cooling to their respective components.

Coolant may flow through coolant line 282, as described above, and/or through coolant line 284 to heater core 290 where the heat may be transferred via air ducts (not shown) to a passenger compartment, and the coolant flows back to engine 110. In some examples, engine-driven water pump 286 may operate to circulate the coolant through both coolant lines 282 and 284.

Turning now to FIG. 3, it shows partial schematic of a vehicle system 300 having a vehicle propulsion system 100 of FIG. 1 that includes engine system 110, including the CAC 218, radiator 280, electric fan 292, AGS system 210, and associated ambient airflow 216 passing therethrough. Other under hood components such as fuel system 340 (not shown in FIG. 3), energy storage devices 150, and the like may also receive the cooling ambient airflow 216 as well. Thus, AGS system 210 may assist cooling system 204 in cooling engine 110 and under hood devices such as radiator 280, AAT sensor 220, and the like. The flow rate of ambient airflow 216 may be increased by adjusting the AGS to a more open position, and by increasing a vehicle speed. Ambient airflow 216 may also be increased when a wind speed is increased in a direction flowing into the AGS, when a vehicle is in motion or when a vehicle is parked.

In the example shown in FIG. 2, AGS system 210 may be a dual active grille shutter system comprising two groups of one or more grille shutters 214 configured to adjust the amount of ambient airflow 216 received through grille 212. In another example, the AGS system 210 may be an active grille shutter system comprising a single group of one or more grille shutters 214. When the grille shutters 214 are open, solar radiation 398 may pass through the AGS system 210 and may heat under hood devices positioned posteriorly to the AGS system 210, such as AAT sensor 220. Under hood devices, including the AAT sensor 220, may further receive radiant heat 368 transferred from the road surface 360, radiant heat 358 transferred from an energy storage device 150, and radiant heat 318 transferred from the engine 110.

Excessive radiant heat transferred to the AAT sensor 220 may cause the AAT sensor 220 to measure an AAT higher than the expected AAT (and higher than the actual AAT), resulting in an inflated, offset measured AAT. Similarly, precipitation of snow, ice, or rain falling on the AAT sensor can depress the AAT measured by the AAT sensor relative to the expected AAT. An inflated or depressed measured AAT can reduce vehicle drivability, increase fuel consumption and fuel emissions, and reduce OBD reliability. For example, cold start engine control routines may determine an amount of enrichment of the air/fuel ratio based on the measured AAT at the AAT sensor. Overestimating or underestimating the AAT due to radiant heat load at the AAT sensor can increase cold start times, fuel consumption, and fuel emissions. As another example, the EVAP fuel system leak diagnostic may adjust its pass/fail thresholds depending on the AAT measured by the AAT sensor. Excessively inflated or depressed AAT indications due to radiant heat load at the AAT sensor can cause erroneous fuel system leak test results, thereby increasing fuel emissions. Similarly, fuel system leak tests are often mandated to occur during a particular temperature window. For instance, the California Air Resources Board (CARE) currently mandates that EVAP leak detection occur during the temperature range from 40 to 95° F.; other OBD routines are typically executed during a temperature range of 25 to 95° F. Executing OBD routines and EVAP leak tests outside of these temperature ranges increases warranty exposure. If radiant heat loads at the AAT sensor give rise to measured AATs above or below the actual AAT beyond a threshold temperature difference, then an EVAP leak test may be performed during unintended or improper conditions, which may increase a risk of voiding vehicle warranties, and may also increase fuel consumption and decrease vehicle drivability. For example, fuel system seals may be more prone to leak at lower AATs; when the AAT sensor indicates an excessively inflated AAT, the fuel EVAP leak test may be foregone, thereby increasing a risk of fuel leaks being undetected at lower AATs. Numerous other OBD and engine control routines are dependent at least partially on a reliable AAT measurement; when the AAT measurement is faulty, the vehicle drivability and performance (e.g., fuel consumption, vehicle responsiveness, reliability, and the like) may be compromised. As such, responsive to detecting a measured AAT greater than an expected AAT by more than a threshold temperature difference, the vehicle control system 190 may conduct an AAT sensor test to correct the AAT sensor or determine if the AAT sensor is faulty including adjusting vehicle actuators to reduce radiant heat transferred to the AAT sensor 220. Further details regarding the AAT sensor test are described below with reference to FIGS. 5, 6A, 6B, 7, and 8.

Radiant heat 398 from the sun may be blocked or reduced by adjusting the AGS to a more closed position. In other words, solar radiant heat 398 may be insulated from the AAT sensor 220 by adjusting at least the first group 304 of grille shutters positioned anteriorly to the AAT sensor 220 to a more closed position. Radiant heat 318 from the engine 110 transferred to the AAT sensor 220 may higher during higher vehicle speeds and higher engine loads. For the case when an AAT sensor 220 may be positioned at an underside of one or more side mirrors 420 of the vehicle 300 (e.g., FIGS. 4A and 4B), exposure of the AAT sensor 220 to solar radiant heat 398 may be higher when the side mirror is retracted relative to when the side mirror is extended, as illustrated in and discussed with reference to FIG. 4B. The side mirrors may be retracted at higher vehicle speeds (e.g., when the vehicle speed is greater than a threshold vehicle speed) to reduce vehicle drag and fuel consumption. Furthermore, the side mirrors may be retracted when the vehicle is parked so as to be less obtrusive and to reduce a risk of the side mirrors being bumped and damaged by other passing vehicles, pedestrians, bicycles, and the like. Thus, controller 312 may adjust a position of one or more side mirrors from a more retracted position to a more extended position to reduce solar radiant heat 398 transferred to the AAT sensor 220. When only one of the side mirrors has an AAT sensor 220 mounted at an underside, the controller 312 may only adjust the position of the side mirror with the AAT sensor 220 mounted thereat, while maintaining a position of the other side mirror.

The radiant heat 318 from the engine 110 may be decreased by increasing ambient air flow to the AAT sensor 220. As such, when the vehicle speed is higher, (e.g., higher than a threshold vehicle speed), the controller 312 may adjust the AGS grille shutters 214 from a more closed position to a more open position in response to an AAT measured by the AAT sensor 220 increasing above the expected AAT by more than a threshold temperature difference. In this way, ambient air flow to the AAT sensor can be increased, thereby reducing radiant heat 318 from the engine 110 thereat. In other words, the increased ambient air flow aids in insulating the AAT sensor 220 from the radiant heat 318 emanating from the engine 110.

Radiant heat 368 from the road surface 360 and radiant heat 358 from energy storage device 150, such as an underbody flat high voltage battery, may also be transferred to the AAT sensor 220. Radiant heat 368 from the road surface 360 may be higher when a vehicle is parked or when the vehicle speed is lower, such as lower than a threshold speed. Elevating an active suspension 111 (as described below with reference to FIG. 4A) of the vehicle may aid in reducing radiant heat from the road surface at the AAT sensor 220 by increasing a distance therebetween between and effectively increasing insulation of the AAT sensor 220 from the road surface 360. In one example, controller 312 may only raise a front suspension of vehicle 300 in order to reduce radiant heat 368 transferred to the AAT sensor from the road surface 360 for the case of an AAT sensor 220 positioned under hood at an anterior region of the vehicle 300. Radiant heat 358 from energy storage device 150 may be higher when the vehicle is parked and energy storage device 150 is being charged, such during a recharging operation of energy storage device 150 for a PHEV from power source 180 by way of electrical transmission cable 182 that electrically couples energy storage device 150 with a power source 180. Radiant heat 358 transferred to the AAT sensor 220 from energy storage device 150 may be reduced by switching on cooling fans such as engine cooling fan 292 while the AGS grille shutters 214 are open to circulate ambient air 216 across the surface of the AAT sensor 220. Increasing flow of ambient air 216 at the AAT sensor 220 can aid in increasing insulation of the AAT sensor 220 from radiant heat 358 from energy storage device 150.

Under certain conditions, the AAT measured by the AAT sensor may also deviate below the expected AAT. For example, during rainy weather, precipitation 396 splashing on to the AAT sensor can reduce a measured AAT below the actual (and expected) AAT. The rain temperature may be lower than the ambient temperature which can cause a measured AAT at the AAT sensor surface to be lower; furthermore, vaporizing or evaporating moisture or water from the surface of the AAT sensor may evaporatively cool the AAT sensor, thereby lowering the apparent AAT measured at the AAT sensor surface. If evaporative (or other cooling sources) at the AAT sensor surface give rise to measured AATs below the actual AAT, then an EVAP leak test or other OBD diagnostics may be foregone during temperature conditions when they would otherwise be performed, which may increase a risk of voiding vehicle warranties, and may also increase fuel consumption and decrease vehicle drivability. For example, evaporative cooling of rain drops on an AAT sensor may decrease the measured AAT below an actual ambient temperature near 40° F., thereby resulting in EVAP leak tests being foregone when they otherwise would be performed. Similarly, snow and/or ice depositing (or rain freezing) on a surface of the AAT sensor may substantially decrease a measured AAT below 40° F. when an actual ambient temperature is above 40° F. and at an ambient temperature when EVAP leak tests or other OBD diagnostics are scheduled to be performed.

Adjusting the AGS grille shutter position to a more closed position may obstruct precipitation from depositing on a surface of the AAT sensor positioned between AGS grille shutters and a radiator, thereby reducing a risk of a measured AAT deviating below an actual and/or expected AAT by more than a threshold temperature difference. For the case where an AAT sensor is mounted at a side mirror, adjusting the side mirror to a more extended position may reduce a risk of precipitation depositing on a surface of the AAT sensor, thereby reducing a risk of a measured AAT deviating below an actual and/or expected AAT by more than a threshold temperature difference.

Grille shutters 214 may cover a front region of the vehicle spanning from just below the hood to the bottom of the bumper, for example. By covering the vehicle front end, drag may be reduced and entry of external cooling air to the radiator 280 and CAC 218 may be reduced. For example, vehicle drag may be decreased more when the AGS grille shutters 214 are closed than when the AGS grille shutters 214 are open or partially open. Drag friction increases with vehicle speed; thus, when the vehicle speed is higher than a threshold vehicle speed, the grille shutters 214 may be closed to reduce drag and fuel consumption. When the vehicle speed is lower than a threshold speed, such as during stop-start vehicle operation, the drag friction is lower and the AGS grille shutters 214 may be opened to allow ambient air flow therethrough to cool the engine. Because the ambient air flow through the grille shutters 214 may be lower at lower vehicle speeds, the engine cooling fan 292 may be switched on intermittently to draw ambient air flow over the radiator 280 to provide increased engine cooling. In some embodiments, all grille shutters 214 may be moved in coordination by the controller 312. In other embodiments, grille shutters 214 may be divided into groups and the controller 312 may adjust opening/closing of each group of grille shutters 214 independently. For example, a first group of grille shutters 304 may be positioned in front of the radiator 280 and a second group of grille shutters 306 may be positioned in front of the CAC 218.

AGS system may include one or more AGS position sensors 215 located in close proximity to the grille shutters 214. In one example, at least one AGS position sensor 215 may be located in close proximity to each group of grille shutters 214. For example, at least one AGS position sensor 215 may be positioned in close proximity to each of the first group of grille shutters 304 and the second group of grille shutters 306. As another example, the AGS position sensor 215 may be arranged in close proximity to an AGS motor 302. In one example, the AGS position sensor 215 may be a Hall effect sensor. A Hall effect sensor may include a transducer that varies its output voltage in response to a magnetic field such as a magnetic field produced by a rotating AGS motor 302. The AGS position sensors 215 may be calibrated in response to a key-on engine status. For example, the AGS may be automatically moved to a fully open position by the controller in response to a key-off engine status. Thus, at key-on, the AGS position sensors may be calibrated to correspond to a fully open position, and subsequent control actions to change the AGS position via the AGS motor 302 may be made relative to the key-on calibration position.

As shown in FIG. 3, the first group of grille shutters 304 may be positioned vertically above, with respect to a surface on which vehicle 300 sits, the second group of grille shutters 306. As such, the first group of grille shutters 304 may be referred to as the upper grille shutters and the second group of grille shutters 306 may be referred to as the lower grille shutters. An amount of opening of the first and second groups of grille shutters 304 and 306 may control an amount of ambient airflow 216 directed there behind. In the example of FIG. 3, the amount of opening of the first group of grille shutters 304 may control an amount of ambient airflow 216 directed to the AAT sensor 220 and radiator 280 and an amount of opening of the second group of grille shutters 306 may control an amount of ambient airflow directed to the CAC 218. As such, the upper grille shutters may largely affect vehicle drag and engine cooling (and cooling of the AT sensor 220) while the lower grille shutters may largely affect CAC cooling.

In some examples, each group of grille shutters 304 and 306 may contain the same number of grille shutters 214, while in other examples one group of grille shutters may contain a greater number of grille shutters than the other group. In one embodiment, the first group of grille shutters 304 may contain multiple grille shutters, while the second group of grille shutters 306 contains one grille shutter. In an alternate embodiment, the first group of grille shutters 304 may only contain one grille shutter, while the second group of grille shutters 306 contains multiple grille shutters. In alternate embodiments, all the grille shutters 214 may be included in a single group of grille shutters and an amount of opening of the single group of grille shutters 214 may affect vehicle drag, engine cooling, and CAC cooling.

As shown in FIG. 3, AAT sensor 220 may be interposed between the radiator 280 and the AGS. Specifically, the AAT sensor 220 may be positioned anteriorly to the radiator 280 and posteriorly to the AGS, or posteriorly to a first or second group 304 or 306, respectively, of active grille shutters. In this way, the AAT sensor 220 may be positioned directly behind or adjacent to a first group 304 of AGS, and non-adjacently behind a second group 306 of AGS. In this way, adjusting the first group 304 of AGS to a more open or a more closed position can alter an amount of ambient air and solar radiation entering the first group 304 of AGS and impinging on the AAT sensor.

Grille shutters 214 may be positioned between fully open position and a fully closed position, and may be maintained at the fully open position, the fully closed position, or a plurality of intermediate positions therebetween. In other words, opening of grille shutters 214 may be adjusted such that grille shutters 214 are opened partially, closed partially, or cycled between a fully open position and a fully closed position to provide airflow for cooling engine system components. The fully open position may be referred to as a maximal amount of opening (or maximal percentage opening) position and the fully closed position may be referred to as a maximal amount of closing (or maximal percentage closed) position. An amount of opening of the grille shutters 214 or group of grille shutters (e.g., first group of grille shutters 304 or second group of grille shutters 306) may be denoted by a percentage (e.g., percentage opening). For example, when the AGS are halfway between an opened and closed position, the AGS may be 50% open (or 50% closed). When the AGS are opened to the maximal percentage opening (e.g., an upper threshold amount of opening), the AGS may be 100% open.

The grille shutters 214 (e.g., upper grille shutters or the lower grille shutters) may be actuated by an AGS motor 302. AGS motor 302 may be operatively coupled to the control system 190. As an example, controller 312 may be communicably connected to AGS system 210, and may have executable instructions stored thereon to adjust opening of grille shutters 214 via AGS motor 302. Controller 312 may send signals for adjusting the AGS system 210 to AGS motor 302. These signals may include commands to increase or decrease the opening of the upper and/or lower grille shutters. As an example controller 312 may output voltages to AGS motor 302 that correspond to fully opening, fully closing, or partially opening the grille shutters 214. For example, controller 312 may output a voltage to the AGS motor 302 to open the upper grille shutters to 30% open, or any other percentage opening between 0 and 100%. Correspondingly, the AGS motor 302 may draw an AGS motor current upon fully opening, fully closing, or partially opening the grille shutters 214. Furthermore, the controller 312 may detect or measure the AGS motor current to determine an AGS position. Further still, the output voltage to the AGS motor and the AGS motor current may be of a first polarity when rotating the AGS motor in a first direction (e.g., corresponding to opening the AGS grille shutters), and the output voltage to the AGS motor and the AGS motor current may be of a second polarity opposite to the first polarity when rotating the AGS motor in a second direction opposite to the first direction (e.g., corresponding to closing the AGS grille shutters).

AGS motor 302 may be coupled to one or more grille shutters 214. For example, AGS motor 302 may be coupled to a first grille shutter 214, the first grille shutter mechanically linked to the remaining grille shutters 214. In another example, AGS motor 302 may be coupled to each grille shutter 214 or each group of grille shutters. Further, in some examples, the AGS system 210 may include more than one motor for controller more than one group or more than one individual grille shutter. In one example, the controller 312 may actuate the AGS motor 302 to adjust an AGS opening to a more open or a more closed position in response to an AAT deviating from an expected AAT by more than a threshold temperature difference while conducting an AAT sensor test. In other examples, the controller 312 may switch cooling fan 292 to an ON state from an OFF state in response to an AAT deviating from an expected AAT by more than a threshold temperature difference while conducting an AAT sensor test. In further examples, the controller may extend a side mirror, or raise an active suspension 111 in response to an AAT deviating from an expected AAT by more than a threshold temperature difference while conducting an AAT sensor test. The responsive action taken by the controller 312 may depend on the current vehicle operating conditions, such as whether or not the vehicle is in motion, parked, or operating in start/stop mode. Further details regarding the AAT sensor test are described with reference to FIGS. 5, 6A, 6B, 7, and 8.

Turning now to FIGS. 4A and 4B, they illustrate side and top view schematics of a vehicle 300. Vehicle 300 may comprise vehicle propulsion system 100 of FIG. 1, including engine 110, cooling system 204, and fuel system 340. Vehicle height H1 can refer to the front vehicle height of the vehicle and can comprise the height of the front wheel well, whereas H2 can refer to the rear vehicle height of the vehicle and can comprise the height of the rear wheel well, as depicted in FIG. 4. Vehicle 400 may also comprise additional vehicle heights (e.g. H3, H4, and the like, not shown) wherein each vehicle height corresponds to the vehicle height at each vehicle drive wheel 130. As previously discussed, vehicle 300 may also comprise vehicle height sensors (not shown) that communicate one or more vehicle heights to control system 190.

Under certain conditions while the vehicle is in operation, vehicle heights may change relative to one another, at least momentarily. For example, when the vehicle accelerates, the rear vehicle height may compress relative to the front vehicle height (e.g., H2<H1), giving rise to nose-up vehicle squat during the acceleration period. Conversely, when the vehicle decelerates or brakes, the front vehicle height may compress relative to the rear vehicle height (e.g., H1<H2), and the vehicle may pitch forward or dive (e.g., nose-down) during the deceleration period. Accordingly, it may be desirable for reducing passenger discomfort, vehicle operation, vehicle life, and the like, to control the individual vehicle heights such that equivalent vehicle heights are maintained during periods of acceleration and deceleration.

Vehicle 300 may further comprise an active suspension system 111 that enables the control system 190 to regulate vertical positioning of the vehicle wheels 130 relative to the vehicle body. Active suspension system may comprise an active suspension system having hydraulic electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. For example, the active suspension system may include hydraulic or electronic actuators that may raise and lower a vehicle body chassis independently at each wheel. Additionally or alternately, the active suspension system may include shock absorbers coupled at each wheel that can be varied in firmness, depending on vehicle operating conditions. In this way, the control system 190 may raise or lower the front and rear of the vehicle independently (e.g., from height H1 to H1A and/or height H2 to H2A, respectively) in response to vehicle operating conditions. The distance a vehicle is raised by the active suspension may be greater than a threshold height difference (e.g., H1A-H1, and H2A-H2). In one example, the controller 312 of control system 190 may transmit a signal to the active suspension system to raise a front vehicle height in order to reduce radiant heat flow from the ground surface (e.g., asphalt, pavement, cement, and the like) at the AAT sensor 220 when the vehicle is stopped or parked. Radiant heat from the ground surface may inaccurately bias an AAT sensor 220 to indicate a higher than actual ambient air temperature. By raising the active suspension by more than a threshold height difference, the radiant heat flow from the ground surface to the AAT sensor 20 may be reduced, thereby increasing a measurement accuracy of the AAT sensor 20. The threshold height difference may correspond to a height difference beyond which radiant heat at the AAT sensor 20 may be substantially reduced such that a deviation in AAT measured at the AAT sensor 20 from the $AAT_{exp}$ decreases below the threshold temperature difference.

Turning now to FIG. 4A it illustrates a top view of the vehicle 300, including side mirrors 420 and 420A with AAT sensors 220 and 220A mounted at an underside thereon, respectively. Side mirror 420 is shown in an extended position while side mirror 420A is shown in a withdrawn position. AAT sensors 220 and 220A may be mounted on one or both side mirrors 420 and 420A, respectively. The side mirrors 420 and 420A may be extended or withdrawn depending on vehicle operating conditions. For example, when the vehicle is parked, the side mirrors may be withdrawn or retracted (as illustrated by arrow 422) to reduce the risk of the side mirrors being damaged. Conversely, when the vehicle is in motion, the side mirrors may be extended (as illustrated by arrow 424) to aid in increasing visibility of the vehicle's environs and to increase vehicle drivability for the vehicle driver. Extending the side mirrors while the vehicle is in motion can increase air flow drag, thereby increasing fuel consumption. Because autonomous vehicles (AVs) depend more on navigational sensors and less on side mirrors for vehicle navigation, side mirrors may be retracted during AV operation to reduce vehicle drag and fuel consumption.

The side mirror position can also affect solar radiation at the AAT sensor. Because the side mirror 420 is in an extended position, the AAT sensor 220 may be more shielded from solar radiation since the AAT sensor 220 is positioned at a proximal position 432 that is relatively further from a distal edge 434 of the side mirrors. Conversely, because the side mirror 420A is in a retracted position, the AAT sensor 220A may be less shielded from solar radiation since the AAT sensor 220A is positioned at a proximal position 442 that is relatively closer to a distal edge 444 of the side mirrors. As such the controller 312 may withdraw or retract a side mirror having an AAT sensor 220 mounted thereat to reduce solar radiant heat 398 at the AAT sensor 220. For example, responsive to an AAT measured at the AAT sensor 220 being greater than an expected AAT by more than a threshold temperature difference, controller 312 may retract one or more side mirrors 420 and 420A.

Vehicle 300 may further include a solar sensor 482 mounted on an upper surface of the rearview mirror 480. Solar sensor 482 may transmit signals to the control system 190 (including controller 312) indicating characteristics related to solar radiation received thereat. For example, solar sensor 482 may provide a measure of solar radiation intensity, solar radiation wavelength, and the like. As an example, the magnitude of the solar radiation intensity may provide an indication of the vehicle's orientation relative to the position of the sun, for a given time of day. Accordingly, the solar sensor 482 may aid in positioning the vehicle 300 facing more towards or facing more away from the sun.

Turning now to FIGS. 5, 6A, and 6B, flow charts for high level example methods 500, 600, and 602 for operating a vehicle system to reduce temperature measurement errors associated with the ambient air temperature sensor, are shown. More specifically, methods 500, 600, and 602 may be used to conduct an AAT sensor test to correct excessively high or low AAT measurements by an AAT sensor relative to an expected AAT, and to indicate if the AAT sensor is faulty. In this way, adverse effects to vehicle controls and OBD procedures caused by inflated or depressed AAT measurements can be reduced. Methods 500, 600, and 602 are described with reference to the systems described herein and shown in FIGS. 1-3 and FIGS. 4A and 4B, though it should be understood that similar methods may be applied to other systems without departing from the scope of this disclosure. Methods 500, 600 and 602 may be carried out by a controller, such as controller 312 of control system 190, as shown in FIGS. 1 and 2, and may be stored at the controller 312 as executable instructions in non-transitory memory. Instructions for carrying out methods 500, 600, and 602 and the rest of the methods included herein may be executed by the controller 312 based on instructions stored on a memory of the controller 312 and in conjunction with signals received from sensors of the vehicle system 300, such as the MAP sensor (e.g., 378), exhaust pressure sensor (e.g., 389), exhaust gas sensor (e.g., 386), exhaust temperature sensor (e.g., 388), fuel pressure sensor (e.g., 382), and fuel temperature sensor (e.g., 383), described above with reference to FIG. 1 and FIG. 2. The controller may employ evaporative emissions system actuators such as the active suspension system for raising front and/or rear vehicle heights (as described with reference to FIG. 4A), engine cooling fan 292, side mirrors 420 and 420A, and AGS grille shutters 214 for reducing radiant heat transferred to the AAT sensor 220, according to the methods described below. Other engine, fuel system, engine cooling system, and evaporative emissions system actuators may additionally be employed according to the methods described below.

Method 500 begins at 510 and may include evaluating current vehicle operating conditions. Operating conditions may be estimated, measured, and/or inferred, and may include one or more vehicle conditions, such as vehicle speed, vehicle location, vehicle ON/OFF status, active suspension height, AGS positioning, side mirror positioning, as well as various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as humidity, barometric pressure, etc. In the case where the vehicle includes an autonomous vehicle (AV), the controller 312 may further gather data from LIDAR, radar, digital camera, GPS and other sensors related to the vehicle environment such as proximity of other vehicles, lane markers, road signage, road perimeter locations (e.g., curbs, shoulders, and the like), available parking spaces, and the like. Continuing from 510, method 500 proceed to 520 where a measured AAT ($AAT_{meas}$) determined using the AAT sensor 220. The $AAT_{meas}$ be measured by an AAT sensor 220 positioned between the radiator 280 and AGS grille shutters 214 in an under hood region of the vehicle 300, as shown in FIG. 3, and/or by an AAT sensor 220 mounted at an underside of a side mirror 420, as shown in FIGS. 4A and 4B. $AAT_{meas}$ may further be estimated by other temperature sensors on-board the vehicle that are substantially insulated or isolated from radiant heat sources. For the case where the $AAT_{meas}$ is estimated using multiple on-board temperature sensors, $AAT_{meas}$ may be determined using the lowest of the temperatures indicated by the multiple temperature sensors since that temperature may be indicative of the AAT in the absence of radiant heat. In some examples, vehicle 300 may include more than one AAT sensor 220 positioned at one or more of these locations. For the case of multiple AAT sensors 220, the measured AATs may be aggregated such as by averaging or weight-averaging the multiple measured AATs, or each measured AAT may be stored by the controller 312.

At 530, method 500 continues by determining the expected AAT, $AAT_{exp}$. As described above, controller 312 may wirelessly communicate to a weather cloud data source to receive current and forecasted weather data such as ambient air temperature, humidity, wind speed, wind direction, solar intensity, cloud cover, and the like from various sources such as a weather cloud station, weather internet sites, and the like. Furthermore, control system 190 may wirelessly receive ambient air temperature data from real-time crowd sourced vehicle data. In this way data from one or multiple external sources may be aggregated (e.g., averaged, weight-averaged, and the like) to infer or predict an expected ambient air temperature at any given time or location of the vehicle. Next, at 540, method 500 calculates the deviation of $AAT_{meas}$ from $AAT_{exp}$ and compares it to a threshold temperature difference, $\Delta T_{TH}$. The deviation $|AAT_{meas} - AAT_{exp}|$ may be a positive deviation (e.g., $AAT_{meas} > AAT_{exp}$) or may be a negative deviation ($AAT_{meas} < AAT_{exp}$). $AAT_{meas}$ may deviate positively from $AAT_{exp}$ for the case when radiant heat is transferred to the AAT sensor, thereby inflating $AAT_{meas}$ relative to the actual and/or expected AAT. $AAT_{meas}$ may deviate negatively from $AAT_{exp}$ for the case where the AAT sensor is cooled relative to the actual and/or expected AAT (e.g., due to precipitation of rain or snow on the AAT sensor, and evaporative cooling thereof). The $\Delta T_{TH}$ may correspond to a temperature difference above which engine controls and OBD procedures are adversely affected, and can compromise fuel economy, vehicle drivability, and vehicle emissions. In one example, the $\Delta T_{TH}$ may be 5-15° F. For example, $\Delta T_{TH}$ may correspond to a temperature difference of 10° F. Furthermore, $\Delta T_{TH}$ may depend on whether $AAT_{meas}$ deviates positively or negatively from $AAT_{exp}$. In the case where $AAT_{meas}$ deviates negatively from $AAT_{exp}$, $\Delta T_{TH}$ may include 5-10° F. For the case where the $AAT_{meas}$ deviates from $AAT_{exp}$ by less than $\Delta T_{TH}$, the controller 312 maintains vehicle actuators in their current states according to method 500, and confirms functional operation of the AAT sensor at 544. Confirming functional operation of the AAT sensor may include notifying the vehicle operator by way of a visual or aural cue at the vehicle instrument panel 196. After 544, method 500 ends.

Returning to 540, when the $AAT_{meas}$ deviates from $AAT_{exp}$ by more than $\Delta T_{TH}$, the controller 312 responsively proceeds to conduct an AAT sensor test at 550. The AAT sensor test is performed to determine if the cause of the $AAT_{meas}$ deviating from $AAT_{exp}$ by more than $\Delta T_{TH}$ is due to excessive radiant heat inflating the temperature in the vicinity of the AAT sensor 220, precipitation and/or evaporative cooling excessively depressing the temperature in the vicinity of the AAT sensor 220, or if the AAT sensor is faulty and malfunctioning. The AAT sensor tests adjusts various vehicle actuators, depending on vehicle operating conditions, in order to assess the influence of radiant heat at the AAT sensor 220. At 552, the controller 312 adjusts one or more vehicle actuators to reduce a deviation of $AAT_{meas}$ from $AAT_{exp}$. For the case where $AAT_{meas} > AAT_{exp}$ by more than the threshold temperature difference, controller 312 may adjust the one or more vehicle actuators to reduce radiant heat transferred to the AAT sensor. For the case where $AAT_{meas} < AAT_{exp}$ by more than the threshold temperature difference, controller 312 may adjust the one or more vehicle actuators to reduce or block precipitation from depositing or contacting the AAT sensor, thereby decreasing depression of $AAT_{meas}$ relative to $AAT_{exp}$. Methods 600 and 602 illustrate various examples of adjusting vehicle actuators to evaluate the influence of radiant heat sources on the AAT sensor measurement, depending on current vehicle operating conditions.

Method 600 begins at 610 where it determines if the vehicle status is ON. A vehicle status may be ON following a key-on event whereby a key is inserted into an ignition interface. Alternately, a vehicle status may be switched ON when a start/stop button is depressed to switch on the vehicle. If the vehicle status is ON, method 600 continues at 612 where the controller 312 determines if $AAT_{meas} < AAT_{exp}$, corresponding to a measured AAT deviating below (e.g., negatively) from $AAT_{exp}$. As described previously, $AAT_{meas}$ may be less than $AAT_{exp}$, during conditions where precipitation contacts and/or deposits on the AAT sensor. Because the precipitation (e.g., rain, snow, ice, sleet, hail, and the like) temperature may be less than the actual or expected ambient temperature, the precipitation may cause the AAT sensor to measure a lower than actual ambient temperature. Furthermore, evaporative cooling of the precipitation at the AAT sensor surface may also lower $AAT_{meas}$. Responsive to $AAT_{meas}$ being less than $AAT_{exp}$ by more than the threshold temperature deviation, the controller 312 continues at 614 where it determines if the AAT sensor is mounted at a retracted side mirror. For the case where the AAT sensor is mounted at a side mirror and where the side mirror is retracted, the method 600 continues at 616 where the controller 312 adjusts the side mirror with the AAT sensor to a more extended position. Extending the side mirror having the AAT sensor mounted thereunder may aid in shielding the AAT sensor from precipitation. Accordingly, the deviation of $AAT_{meas}$ below $AAT_{exp}$ may be reduced. Returning to 614 for the case where the AAT sensor is not mounted at a retracted side mirror, method 600 continues at 618 where the controller 312 adjusts the AGS from a more open position to a more closed position. Adjusting the AGS to a more closed position including fully closing the AGS grille shutters, may aid in blocking precipitation from contacting the AAT sensor. In this way, the indicated $AAT_{meas}$ may deviate less substantially from $AAT_{exp}$. In this way, controller 312 may adjust vehicle actuators responsively to a deviation of $AAT_{meas}$ decreasing below $AAT_{exp}$ by more than a threshold temperature difference, when a vehicle is ON or OFF. Following 616 and 618, method 600 returns to method 500, immediately following 552.

Returning to 612, for the case where $AAT_{meas}$ is not less than $AAT_{exp}$, method 600 proceeds to 620 where it determines if the AAT sensor is mounted at a retracted (e.g., fully or at least partially retracted) side mirror. For the case where the AAT sensor is mounted at the side mirror (e.g., as illustrated in FIGS. 4A and 4B), at 624 the controller 312 can adjust the position of the side mirror with the AAT sensor mounted thereon from a more retracted position to a more extended position. In one example, the controller 312 may adjust the side mirror position by more than a threshold position change, for example, from a fully retracted position to a fully extended position. The threshold position change may comprise a position change wherein the amount of radiant heat transferred to the AAT sensor mounted thereat is substantially reduced. In one example, the threshold position change may be more than 50% of the range of motion of the side mirror from fully extended to fully retracted. By adjusting the side mirror having the AAT sensor mounted thereon to a more extended position, a solar radiant heat 398 transferred to the AAT sensor may be reduced. In effect, by extending the side mirror outwards, the AAT sensor is increasingly insulated from the solar radiant heat 398. For example, in the case of an autonomous vehicle (AV), side mirrors may be retracted while the vehicle is in motion, especially at high speeds, to reduce vehicle drag and to decrease fuel consumption. Although the vehicle drag may be increased, extending the side mirror(s) can aid in reducing a deviation of $AAT_{meas}$ at the AAT sensor from an expected AAT.

Returning to 620 for the case where an AAT sensor is not mounted at a retracted side mirror, method 600 continues at 630 where the controller 312 determines if a vehicle speed is lower than a threshold vehicle speed. The threshold vehicle speed may correspond to a vehicle speed above which the AGS grille shutters 214 may be adjusted to a more closed position (including fully closed) in order to reduce vehicle drag and fuel consumption. The threshold speed may also correspond to a vehicle speed below which the AGS grille shutters 214 are adjusted to a more open position (including fully open) in order to increase ambient air flow 216 to the radiator 280 and engine 110. For example, the vehicle may be operating in start-stop mode when the vehicle speed is less than the threshold vehicle speed. In one example, the threshold vehicle speed may be 5 mph or less. If the vehicle speed is less than the threshold vehicle speed, the method continues at 634 where the controller 312 adjusts the AGS grille shutters 214 from a more open position to a more closed position in order to reduce solar radiant heat 398 transferred to the AAT sensor 220. In one example, the controller 312 may adjust the AGS grille shutter position by more than a threshold AGS position change, for example, from a fully open position to a fully closed position. The threshold AGS position change may comprise an AGS position change wherein the amount of radiant heat transferred to the AAT sensor mounted therebehind is substantially reduced. In one example, the threshold AGS position change may be more than 50% of the range of motion of the AGS grille shutters from fully open to fully closed. As described above, adjusting the AGS grille shutters 214 may include adjusting only a first group 304 of grille shutters directly adjacent or anterior to the AAT sensor 220. In this way, some ambient air flow 216 to the engine 110 can be maintained through other open groups (e.g., second group 306) of grille shutters 214, while reducing drag and fuel consumption. In addition to adjusting the AGS grille shutters 214 at 634, the controller 312 may also adjust the active suspension from a more lowered position to a more elevated position. Raising the active suspension of the vehicle can aid in reducing radiant heat 368 transferred to the AAT sensor 220 from a road surface 360 below the vehicle 300. In one example, the controller 312 may adjust the active suspension height by more than a threshold height change, for example, from a fully lowered position to a fully raised position. The threshold height change may comprise a height change wherein the amount of radiant heat transferred to the AAT sensor is substantially reduced. In one example, the threshold height change may be more than 50% of the range of motion of the active suspension from fully lowered to fully raised. As described above, raising the active suspension of the vehicle may include raising only the front suspension of the vehicle to raise the AAT sensor 220 relative to the road surface 360. In one example, for the case where the vehicle 300 includes a HEV operating in start-stop mode (e.g., during heavy traffic, when queueing at a drive-thru, and the like) closing the AGS grille shutters 214 and/or elevating the active suspension may aid in conserving power of an energy storage device 150 such as a battery, while reducing radiant heat transferred to the AAT sensor 220.

Returning to 630, during conditions where the vehicle speed is greater than the threshold vehicle speed, method 600 continues at 640 where the controller 312 adjusts the AGS grille shutters 214 from a more closed position to a more open position. As previously mentioned, when the vehicle speed is higher (e.g., greater than the threshold vehicle speed), the AGS grille shutters 214 may be closed in order to reduce vehicle drag and fuel consumption. However closing the AGS grille shutters 214 reduces or blocks ambient air flow 216 to the engine 110. As such, radiant heat 318 transferred from the engine 110 to the AAT sensor 220 can increase substantially, especially during high engine loads, such as when accelerating or maintaining higher vehicle speeds, traveling uphill, towing, or driving in deserts. Consequently, adjusting the AGS grille shutters 214 (or at least a first group 304 of AGS grille shutters 214) from a more closed position to a more open position can aid in increasing ambient air flow 216 to cool the AAT sensor 220 and the engine 110, thereby insulating the AAT sensor 220 from the engine radiant heat 318. In other words, radiant heat 318 transferred from the engine to the AAT sensor 220 may be reduced by adjusting the AGS grille shutters 214 from a more closed position to a more open position, including fully opening the AGS grille shutters 214. Furthermore, after 624, 634, and 640, method 600 returns to method 500 at 560.

Returning to 610 for the case where the vehicle is OFF (e.g., vehicle status is not ON), method 600 continues at method 602 of FIG. 6B, beginning at 650. A vehicle-off event may comprise a key-off event using an active key that can be inserted/removed from a vehicle ignition interface, or via an electronic key fob or smart key which do not have to be physically inserted or removed from the ignition interface. In another example, the vehicle-off event may comprise a vehicle operator depressing a start/stop button to shut down the vehicle. When the vehicle is OFF, controller 312 may determine at 650 if a pre-trip condition is satisfied. As an example, a pre-trip condition may be satisfied if an impending trip is scheduled and if the current time is within a pre-trip duration just prior to the start of the scheduled impending trip. As previously described with reference to FIG. 1, control system 190 may store regularly scheduled vehicle trip routes and times; routes and times for regular trips such as from home to work, home to school, and the like, may be stored in coordination with GPS mapping tools and with calendar scheduling tools. As such, the control system 190 may be able to schedule vehicle actions associated with a pre-trip duration immediately preceding a scheduled trip to increase vehicle drivability and passenger comfort by preparing or priming the vehicle conditions for the impending trip.

If a pre-trip duration is determined, method 602 continues at 652 where the controller 312 determines if $AAT_{meas} < AAT_{exp}$, corresponding to a measured AAT deviating below (e.g., negatively) from $AAT_{exp}$. As described previously, $AAT_{meas}$ may be less than $AAT_{exp}$, during conditions where precipitation contacts and/or deposits on the AAT sensor. Because the precipitation (e.g., rain, snow, ice, sleet, hail, and the like) temperature may be less than the actual or expected ambient temperature, the precipitation may cause the AAT sensor to measure a lower than actual ambient temperature. Furthermore, evaporative cooling of the precipitation at the AAT sensor surface may also lower $AAT_{meas}$. Responsive to $AAT_{meas}$ being less than $AAT_{exp}$ by more than the threshold temperature deviation, the controller 312 continues at 654 where it determines if the AAT sensor is mounted at a retracted side mirror. For the case where the AAT sensor is mounted at a side mirror and where the side mirror is retracted, the method 602 continues at 656 where the controller 312 adjusts the side mirror with the AAT sensor to a more extended position. Extending the side mirror having the AAT sensor mounted thereunder may aid in shielding the AAT sensor from precipitation. Accordingly, the deviation of $AAT_{meas}$ below $AAT_{exp}$ may be reduced. Returning to 654 for the case where the AAT sensor is not mounted at a retracted side mirror, method 602 continues at 658 where the controller 312 adjusts the AGS from a more open position to a more closed position. Adjusting the AGS to a more closed position including fully closing the AGS grille shutters, may aid in blocking precipitation from contacting the AAT sensor. In this way, the indicated $AAT_{meas}$ may deviate less substantially from $AAT_{exp}$. In this way, controller 312 may adjust vehicle actuators responsively to a deviation of $AAT_{meas}$ decreasing below $AAT_{exp}$ by more than a threshold temperature difference, when a vehicle is ON or OFF. Following 656 and 658, method 602s returns to method 500, immediately following 552.

Returning to 652, for the case where $AAT_{meas}$ is not less than $AAT_{exp}$, method 602 continues at 660, where the controller 312 determines if the vehicle is an autonomous vehicle (AV) and the AAT sensor positioned towards the sun. If the vehicle is an AV having an AAT sensor is positioned towards the sun, method 602 continues at 664 where controller 312 determines if repositioning the AV is lawful and/or possible. Repositioning the AV may depend on the location of the vehicle and the availability of parking spaces, room to maneuver the vehicle, if the street the vehicle is located is a one-way street, and the like. For example, if there is no space or if the roadway to maneuver the vehicle into the desired orientation is blocked, repositioning the vehicle may not be possible without executing unlawful vehicle maneuvers (e.g., colliding with another vehicle, driving over a road curb, and the like). In the case where city street ordinances, parking lot space availability, or other spatial conditions preclude lawful repositioning or reparking of the AV (e.g., in other words repositioning or reparking the AV so that the AAT sensor is oriented more away from incident solar radiation would be unlawful), method 602 continues at 670. As one example, controller 312 may determine if repositioning the vehicle is lawful based on GPS information regarding the vehicle location, the locations of other vehicles nearby, and road and traffic laws/regulations at that location, as detected from one or more sensors such as radar sensors 494 and LIDAR sensory system 490. For example, on a one-way street, the vehicle may only be parked facing the direction of the flow of traffic, and may not be reparked or repositioned to face another orientation without being unlawful. As another example, reparking or repositioning the AV to orient the AV more away from incident solar radiation includes repositioning the AV in a shaded or covered parking space. For example, GPS information may indicate the presence of a covered or underground parking space nearby, or the presence of trees and or tall buildings which may shade parking adjacent or nearby parking spaces. Combining information regarding the position of trees and or tall buildings relative to nearby vacant parking spaces, and the location of nearby covered or underground parking spaces, along with data indicating which direction shadows would be cast according to the sun position and time of day, the AV control system 191 may determine if repositioning the AV in a shaded vacant parking space is lawful and possible. Repositioning the AV in a shaded parking space may aid in reducing radiant heat from being transferred to the AAT sensor, thereby reducing a deviation of the AAT measured at the AAT sensor from the expected AAT.

In the case where repositioning the vehicle is possible and lawful, method 602 proceeds to 668 where the controller 312 adjusts one or more vehicle actuators to reposition the AV to orient the AAT sensor more away from incident solar radiation. Adjusting the one or more vehicle actuators to reposition the AV may include one or more of switching on an engine and/or motor, disengaging a parking gear, engaging a transmission gear to a reverse gear, engaging a transmission gear to a drive gear, engaging a steering system to turn the drive wheels, accelerating and/or decelerating the vehicle by engaging the drive wheels, initiating turn signals, re-engaging the parking gear after repositioning the vehicle to orient the AAT sensor more away from the incident solar radiation, and the like. The on-board controller 312 may reposition the AV so that the AAT sensor is not facing towards the sun (e.g., facing more away from incident solar radiation), in order to reduce solar radiant heat transferred to the AAT sensor. An on-board solar cell sensor 482 (e.g., mounted on the rearview mirror, rear windshield, roof of the car, or other exterior surface of the vehicle) and/or an on-board GPS may provide indications to the controller 312 as to the orientation of the sun (and solar radiation transmitted therefrom) relative to the vehicle, and the vehicles AAT sensor. Additionally, knowing the time of day and the geographical location of the vehicle, the controller 312 may compute the location of the sun and hence the direction from which solar radiation is transmitted relative to the vehicle. Furthermore, the data from the solar cell sensor, GPS, and/or other on-board sensors may provide an indication to the controller 312 of whether or not the AAT sensor is facing more towards or more away from incident solar radiation. As described previously, repositioning the AV to orient the AAT sensor more away from the incident solar radiation may include repositioning the AV to a shaded parking space.

Having determined the position of the sun and/or the position of shaded parking spaces, the AV controller 312 may reposition the vehicle so that the AAT sensor is oriented to face more away from the incident solar radiation. For example, during morning hours, the controller 312 may park the AV facing west so that an AAT sensor positioned at a vehicle anterior (e.g., between the AGS grille shutters and the radiator, and the like) is facing away from the sun. Similarly, during afternoon hours, the controller 312 may park the AV facing east so that an AAT sensor positioned at a vehicle anterior (e.g., between the AGS grille shutters and the radiator, and the like) is facing away from the sun. Furthermore, the AV controller 312 may reposition the vehicle to a shaded parking space, thereby orienting the AAT sensor more away from incident solar radiation. Returning to 664, in the case where city street ordinances, parking lot space availability, or other spatial conditions preclude lawful repositioning or reparking of the AV; and returning to 660 for the case where the vehicle is not an AV with an AAT sensor positioned towards the sun, method 602 continues at 670. At 670, the controller 312 determines if the AAT sensor 220 is mounted at a retracted (partially or fully retracted) side mirror. Side mirrors may be retracted while a vehicle is OFF to reduce an obtrusiveness of the side mirror. If the AAT sensor 220 is mounted at a partially or fully retracted side mirror, method 602 continues at 674 where the side mirror position is adjusted from the more retracted position to a more extended position, including fully extending the side mirror. In this way, solar radiant heat 398 transferred to the AAT sensor may be reduced since extending the side mirror can aid in blocking and insulating the AAT sensor 220 from the sun. Returning to 670, if the AAT sensor 220 is not mounted at a retracted side mirror, method 602 continues at 680 where controller 312 determines if the AGS grille shutters are open, including partially open. If the AGS grille shutters are open, then controller 312 continues at 684 where the AGS grille shutters are adjusted from a more open position to a more closed position, including fully closed, in order to block solar radiation from reaching the AAT sensor 220 by way of the AGS system. In this way, solar radiation may be reduced at the AAT sensor, thereby reducing a deviation of $AAT_{meas}$ above $AAT_{exp}$. Returning to 680, if the AGS grille shutters are not open, method 602 continues at 690 where controller 312 determines if the cooling fan is OFF. If the cooling fan is not OFF, method 602 returns to method 500 at 560. For the case where the engine cooling fans are off, method 602 proceeds to 694 where the controller 312 adjusts engine cooling fans by switching them ON, including increasing a fan speed while the AGS grille shutters 214 are open. Switching the cooling fans to ON (or increasing the fan speed) can increase a flow of ambient air 216 to the AAT sensor 220, thereby reducing solar radiant heat 398 transferred to the AAT sensor 220. In one example, increasing the cooling fan speed can include increasing the cooling fan speed by more than a threshold fan speed change. The threshold fan speed change may correspond to a change in fan speed above which radiant heat transferred to the AAT sensor is substantially altered. In another example, the cooling fan speed may be increased above a threshold fan speed, wherein the threshold fan speed provides increased cooling of ambient air to the AAT sensor sufficient to lower a measured AAT thereat. In one example, switching the cooling fans ON can aid in reducing radiant heat 358 transferred from an energy storage device 150 to the AAT sensor 220. In particular, charging high voltage underbody batteries in PHEVs can generate larger amounts of radiant heat 358, which can cause elevated temperatures in the vicinity of the AAT sensor 220. As such, by switching ON the cooling fans, the radiant heat 358 transferred from the batter to the AAT sensor 220 can be reduced. In a conventional vehicle (e.g., non-hybrid, non-PHEV), the cooling fans could be switched OFF when a battery voltage decreases below a threshold voltage, in order to avoid excessively draining the battery. For example, the cooling fans could be switched OFF when the battery voltage decreases below a threshold battery voltage. The threshold battery voltage may correspond to a battery voltage below which the engine may fail to crank during cold climates. For example, the threshold battery voltage may be 11.5 V. Depending on the vehicle type and operating condition, the pre-trip period or duration may be adjusted; for example, the pre-trip period may be set to be long enough for the cooling fans to cool the charging battery enough so that radiant heat 358 transferred to the AAT sensor does not give rise to excessive values of the measured AAT. Returning to 650, for the case where the engine is OFF, and a pre-trip condition is not satisfied, method 602 returns to method 500 at 560. Furthermore, after 656, 658, 640, 668, 674, 684, and 694, method 602 returns to method 500 at 560.

Thus according to method 500, while a vehicle status is ON, the controller 312 may responsively adjust a vehicle actuator to reduce radiant heat transferred to the AAT sensor to a deviation of $AAT_{meas}$ from $AAT_{exp}$ being greater than a threshold temperature difference. Furthermore, while the vehicle status is OFF and during a pre-trip period, the controller 312 may responsively adjust a vehicle actuator to reduce radiant heat transferred to the AAT sensor to a deviation of $AAT_{meas}$ from $AAT_{exp}$ being greater than a threshold temperature difference. While the vehicle is OFF, by only adjusting vehicle actuators responsive to a deviation of $AAT_{meas}$ from $AAT_{exp}$ being greater than a threshold temperature difference during a pre-trip period, fuel and/or electrical energy is conserved and vehicle wear is reduced.

Returning to method 500 at 560, the controller 312 determines if the AAT sensor test end conditions have been met. AAT sensor test end conditions may be met if the vehicle actuator in step 552 has been adjusted for more than a threshold time. In one example, the threshold time may correspond to a predetermined time such as two minutes or less, one minute or less, or 30 seconds. The threshold time may correspond to a duration long enough to reduce radiant heat transferred to the AAT sensor (e.g., increase insulation of the AAT sensor from the radiant heat) so that inflation of the measured AAT at the AAT sensor above the actual AAT by the radiant heat can be substantially reduced. To this end, the threshold time may depend on the dynamics related to temperature and heat transfer conditions in the vicinity of the AAT sensor. For example, the threshold time may be related to a heat capacity of the AAT sensor; the threshold time may be higher for a higher heat capacity since a larger amount of heat may be transferred to or from the AAT sensor to influence its temperature as compared to a lower heat capacity material. The threshold time may further be related to dynamics of purging the air in the vicinity of the AAT sensor. If the air and radiant heat can be purged more quickly from the AAT sensor, the AAT sensor temperature may equilibrate faster, and the threshold time may be reduced. The threshold time may further be set to be longer than a time for adjusting a vehicle actuator to reduce radiant heat transferred to the AAT sensor 220. As such, the threshold time may be set to be longer than adjusting AGS grille shutters from a more open state to a more closed state, adjusting AGS grille shutters from a more closed state to a more open state, raising an active suspension, switching on a cooling fan, adjusting a side mirror to a more extended position, and the like. Furthermore, the AAT test end condition may be met when the difference between the measured AAT at the AAT sensor 220 and the expected AAT is less than the threshold difference, indicating that the previously-inflated $AAT_{meas}$ was due to the transfer of radiant heat to the AAT sensor 220. In one example, the AAT test end condition may be a combination of conditions. In particular, the AAT test end condition may meet if the vehicle actuator has been adjusted in step 552 for more than the threshold time and/or if the measured AAT at the AAT sensor 220 and the expected AAT is less than the threshold difference. Prior to meeting the AAT sensor test end condition, method 500 continues to 564 where method 500 maintains vehicle actuators in their current states, before returning to 560.

If the AAT sensor test end condition has been met at 560, method 500 continues at 570 where the controller 312 remeasures the AAT at the AAT sensor. Remeasuring of the AAT with the AAT sensor at 570 may be in addition or following repeat measuring of the AAT with the AAT sensor while evaluating AAT sensor test end conditions at step 560. Next, at 580, the controller 312 determines if the remeasured $AAT_{meas}$, deviates from $AAT_{exp}$ by more than $\Delta T_{TH}$. If remeasured $|AAT_{meas}-AAT_{exp}|<\Delta T_{TH}$, the AAT measured by the AAT sensor 220 is no longer excessively inflated or deflated relative to the expected AAT, and method 500 continues at 584 where the controller 312 indicates a corrected AAT sensor. Following 584, method 500 may continue at 586 where the adjusted vehicle actuator(s) at 552 are returned to their pre-adjusted states. For example, elevated active suspensions may be lowered, AGS grille shutters adjusted to a more open position may be returned to their more closed position, AGS grille shutters adjusted to a more closed position may be returned to their more open position, cooling fan may be switched OFF, and side mirrors may be adjusted back to their more retracted positions, and the like. Returning to 580, for the case where the remeasured $AAT_{meas}-AAT_{exp}>\Delta T_{TH}$, the AAT measured by the AAT sensor 220 remains excessively inflated relative to the expected AAT, and method 500 continues at 590 where the controller 312 indicates a malfunctioning faulty AAT sensor. Furthermore, the controller 312 may return the adjusted vehicle actuator(s) at 552 to their pre-adjusted states. Next, at 590, responsive to the indication of a faulty AAT sensor, the controller 312 may adjust engine control and OBD routines to estimate the AAT with the $AAT_{exp}$. In other words while the AAT sensor status is faulty, the controller 312 may utilize $AAT_{exp}$ in any engine control and OBD routine calculations in place of $AAT_{meas}$ to maintain vehicle drivability and vehicle operation until the AAT sensor is repaired and replaced (and AAT sensor status is returned to functional). Alternately, the $AAT_{exp}$ may be estimated using another temperature sensor on-board the vehicle. For example, during conditions where the engine has yet been pulled up, the engine oil temperature and/or the transmission oil temperature sensors may be utilized to estimate the $AAT_{exp}$. Similarly $AAT_{exp}$ may be estimated with other on-board temperature sensors substantially isolated or insulated from radiant heat sources, for example, at the engine air intake or exhaust. Furthermore, when the AAT sensor is found to be faulty, the AAT (or $AAT_{exp}$) may be estimated based on the engine oil temperature and/or the transmission oil temperatures, prior to engine pull-up. After 586 and 594, the AAT sensor test is ended, and method 500 ends. Without reducing the radiant heat transferred to the AAT sensor 220, the measured AAT at the AAT sensor would continue to be excessively inflated (in the case of a non-faulty, functioning AAT sensor). As such, in the absence of conducting the AAT sensor test, whereby vehicle actuator(s) are not adjusted to reduce radiant heat transferred to the AAT sensor, the deviation of $AAT_{meas}$ (and remeasured $AAT_{meas}$) from $AAT_{exp}$ would continue to be greater than $\Delta T_{TH}$ for an operational, functioning AAT sensor. Thus, performing the AAT sensor test in response to $AAT_{meas}-AAT_{exp}>\Delta T_{TH}$ can aid in maintain vehicle drivability, while reducing fuel consumption and emissions.

FIGS. 7 and 8 show example timelines 700 and 800 for conducting an AAT sensor test and operating a vehicle to reduce radiant heat at an AAT sensor responsive to a deviation of a measured AAT by the AAT sensor from the expected AAT by more than a threshold temperature difference. The timelines 700 and 800 illustrate vehicle operation according to the methods described herein and with reference to FIGS. 5, 6A, and 6B, and as applied to the systems described herein and with reference to FIGS. 1-3, 4A, and 4B. Timelines 700 and 800 include plot 702, indicating the on or off status of a vehicle, over time. Timelines 700 and 800 include further plot 710, indicating a vehicle speed, over time, as well as a threshold vehicle speed 716. Timeline 700 further includes plot 720, indicating scheduled trip starts and their associated pre-trip periods 722, over time. Timelines 700 and 800 further include plot 730, indicating a measured ambient air temperature (AAT), over time, as well as an expected AAT 740. The measured AAT may be measured by an AAT sensor 220 positioned under hood between a radiator 280 and the AGS grille shutters 214, and/or an AAT sensor 220 mounted at an underside of a side mirror 420. The expected AAT may be determined from one or more cloud data sources such as a weather cloud data source or a crowd-vehicle data source external to the vehicle, as described above. Timelines 700 and 800 further include plot 750, indicating the absolute temperature difference (e.g., temperature deviation) between a measured (or remeasured) AAT by the AAT sensor 220, and the expected AAT, over time. Dashed line 756 represents a threshold temperature difference, above which excessive inflation of the measured AAT above the expected AAT may be indicated. Timelines 700 and 800 further include plot 760, indicating an AGS grille shutter position being open (e.g., more open) or closed (e.g., more closed), over time. Timeline 700 further includes plot 770, indicating a cooling fan on/off status, over time. Timelines 700 and 800 further include plot 780, indicating a side mirror position being extended (e.g., more extended) or retracted (e.g., more retracted), over time. Timeline 700 further includes plot 790, indicating an active suspension position being raised (e.g., more raised) or lowered (e.g., more lowered), over time. Timelines 700 and 800 further include plot 796, indicating an AAT sensor status being functional (e.g., operating normally), corrected (following an AAT sensor test), or faulty (following an AAT sensor test), over time. AAT sensor status may be communicated to a vehicle operator by way of a vehicle instrument panel 196. Timeline 800 further includes plot 890, indicating if an orientation of the AAT sensor is facing more towards the sun (e.g., incident solar radiation), or more away from the sun. The orientation of the AAT sensor may be determined by the controller 312 based on various indications and inputs from various sensors such as the solar sensor 482, current time of day (e.g., clock), GPS, and the like. Timeline 800 further includes plot 896, indicating if repositioning of the vehicle system is lawful. Controller 312 may determine if repositioning the vehicle is lawful based on GPS information regarding the vehicle location, the locations of other vehicles nearby, and road and traffic laws/regulations at that location, as detected from one or more sensors such as radar sensors 494 and LIDAR sensory system 490. As described above the timeline 700 may correspond to operation of various types of vehicles such as conventional combustion engine, hybrid, PHEV, electric, and autonomous vehicles. Timeline 800 may correspond to operation of an autonomous vehicle.

Turning to the timeline 700 of FIG. 7, prior to time $t_1$, the vehicle status is OFF and the vehicle speed is less than the threshold vehicle speed 716. As an example, the vehicle may be parked, awaiting a scheduled trip start at time $t_2$. Furthermore, the AGS grille shutters are open to allow ambient air to circulate under hood, the cooling fan is OFF to conserve power, the side mirror is retracted to reduce obtrusiveness, the active suspension is lowered, and the AAT sensor is functional. As previously described, the $AAT_{exp}$ may be received and/or determined from various external data sources such as real-time crowd vehicle data, weather cloud data, and the like. $AAT_{meas}$ 730, as determined by the AAT sensor 220, is shown to increase steadily relative to $AAT_{exp}$ prior to $t_1$. As examples, $AAT_{meas}$ may increase relative to $AAT_{exp}$ because of radiant heat being transferred to the AAT sensor. For instance, solar radiant heat may be transferred to an exposed AAT sensor, radiant heat from an energy storage device may be transferred to the AAT sensor when the vehicle is being charged while OFF, and the like. As such, the $AAT_{meas}$ is inflated relative to the $AAT_{exp}$, which can lead to reduced vehicle drivability, and increased fuel consumption and vehicle emissions if the inflated $AAT_{meas}$ is indicated to engine controls and OBD routines as the actual AAT. Just prior to time $t_1$, $AAT_{meas}-AAT_{exp}$ (AT 750) exceeds the threshold temperature difference, $\Delta T_{TH}$ 756.

As examples, the scheduled trip start at time $t_2$ may correspond to a home to work commute trip, a daily home to school route, a scheduled weekend errand trip, and the like. Time $t_1$ corresponds to a time within a threshold pre-trip duration 722 prior to the scheduled trip at $t_2$. Responsive to the start of the pre-trip duration 722, and responsive to $\Delta T > \Delta T_{TH}$, the AAT sensor test is conducted, according to methods 500, 600, and 602. Accordingly, controller 312 adjusts the cooling fan 292 from an OFF state to an ON state (including increasing the cooling fan speed) in order to circulate a higher flow rate of ambient air 216 into the AGS grille shutters and over the AAT sensor. For the case of a conventional vehicle propulsion system with an internal combustion engine (e.g., not a hybrid or PHEV), the controller may switch ON the cooling fan only during an additional condition including when the battery voltage is greater than a threshold voltage. In this way, a risk of draining the battery can be reduced so that the battery voltage remains high enough for starting the engine when the vehicle is switched ON. By circulating an increased flow rate of ambient air, the radiant heat transferred to the AAT sensor can be reduced. After the cooling fan is switched ON, $AAT_{meas}$ decreases relative to $AAT_{exp}$, as the AAT sensor is insulated from the radiant heat by the increased circulation of ambient air flow thereat. As such, $\Delta T$ decreases below $\Delta T_{TH}$ 756 between $t_1$ and $t_2$ such that the $AAT_{meas}$ is much closer to $AAT_{exp}$ (and the actual AAT) prior to the start of the scheduled trip at time $t_2$. In response to the $\Delta T$ decreasing below $\Delta T_{TH}$, and/or in response to a threshold time elapsing following switching of cooling fan ON, at time $t_2$ the controller 312 returns the cooling fan to an OFF state and remeasures AAT with the AAT sensor. Because the remeasured $AAT_{meas}$ deviates from $AAT_{exp}$ less than $\Delta T_{TH}$, controller 312 momentarily sets the AAT sensor status 796 to corrected. The corrected sensor status may be communicated to a vehicle operator by way of the instrument panel 196. Thus, by conducting the pre-trip AAT sensor test during the pre-trip duration, the excessively inflated AAT sensor measurement is corrected by reducing radiant heat transferred thereto, thereby maintaining/increasing vehicle drivability, and reducing vehicle emissions and fuel consumption during the impending vehicle trip starting at $t_2$.

At time $t_2$, the vehicle status is switched ON, as scheduled according to the trip start 720 at time $t_2$ stored in non-transitory memory of the control system 190. The vehicle speed 710 increases as the vehicle is driven on its scheduled route, the vehicle speed increasing above the threshold vehicle speed 716 shortly thereafter, but prior to time $t_3$. Responsive to the vehicle speed increasing above the threshold vehicle speed, the AGS grille shutters are adjusted from a more open position to a more closed position, including being fully closed, to reduce vehicle drag and fuel consumption. During the time between $t_2$ and $t_3$, the measured AAT begins to increase relative to the expected AAT while the vehicle speed is above the threshold vehicle speed, for example, due to the increased engine load, which transfers increased radiant heat from the engine to the AAT sensor. Furthermore, because the AGS grille shutters are in a closed position, ambient air is prevented from being circulated at the AAT sensor. At time $t_3$, responsive to the vehicle being ON and $\Delta T$ increasing above $\Delta T_{TH}$, an AAT sensor test is started. In the example timeline 700 of FIG. 7, the controller 312 adjusts both the side mirror position to a more extended position and the AGS grille shutter position from a more closed position to a more open position, responsive to the vehicle being ON and $\Delta T$ increasing above $\Delta T_{TH}$, according to the methods 500, 600, and 602. In the case where an AAT sensor is only located at the underside of a side mirror or only located between the radiator and the AGS system, controller 312 may responsively adjust only the side mirror position to the more extended position or the AGS to the more open position. Furthermore, controller 312 may only responsively adjust the position of a side mirror having an AAT sensor mounted thereunder, while maintaining the position of the other side mirror (without an AAT sensor mounted thereunder). Similarly, controller 312 may only responsively adjust the position of an AGS grille shutter (e.g., a first group of AGS grille shutters) having an AAT sensor mounted adjacently therebehind (e.g., posteriorly), while maintaining the position of the other groups of AGS grille shutters not having an AAT sensor mounted adjacently therebehind.

At time t4, owing to the controller 312 adjusting the AGS grille shutter to a more open position and/or adjusting the side mirror to a more extended position, the radiant heat transferred to the AAT sensor may be reduced. For example, adjusting the AGS grille shutters to a more open position may allow increased flow of ambient air over the AAT sensor thereby increasing an insulation of the AAT sensor from heat radiated from the engine, road surface, and/or energy storage device thereto. As another example, adjusting the side mirror position to a more extended position may aid in reducing solar radiant heat transferred to an AAT sensor mounted under the side mirror. Thus, between time $t_3$ and time $t_4$, $\Delta T$ (e.g., $AAT_{meas} - AAT_{exp}$) decreases below $\Delta T_{TH}$. In response to a threshold time 794 elapsing after opening the AGS grille shutters and/or extending the side mirror, controller 312 returns the AGS grille shutters to their more closed position (including fully closed), returns the side mirror to its more retracted position (including fully retracted), and remeasures $AAT_{meas}$ with the AAT sensor. At time $t_4$, the remeasured AAT deviates from $AAT_{exp}$ by less than the threshold temperature difference. Furthermore, responsive to $AAT_{meas} - AAT_{exp}$ decreasing below $\Delta T_{TH}$, controller 312 momentarily indicates a corrected AAT sensor status at $t_4$.

After time $t_4$, the vehicle speed slows, for example, due to exiting a freeway. At time $t_5$, vehicle speed decreases below the threshold vehicle speed and the vehicle begins operating in start-stop mode, for example, due to encountering congested traffic along its route. In response to the vehicle speed decreasing below the threshold vehicle speed, the controller 312 opens the AGS grille shutters to allow increased ambient air to cool the engine. Furthermore, controller 312 intermittently switches the cooling fan ON (and OFF), so that the engine can be cooled (so as to reduce overheating) during start-stop mode when the vehicle is stopped. Between times $t_5$ $t_6$, the measured AAT begins to increase relative to the $AAT_{exp}$, for example, due to solar radiant heat being transferred to the AAT sensor through the open AGS grille shutters and/or increased radiant heat being transferred to the AAT sensor from the road surface when the vehicle is stopped. At time $t_6$, $\Delta T$ (e.g., $AAT_{meas} - AAT_{exp}$) increases above $\Delta T_{TH}$. In response to $\Delta T > \Delta T_{TH}$ while the vehicle speed is below the threshold vehicle speed (or alternately while the vehicle is in start-stop mode), controller 312 starts an AAT sensor test by adjusting the AGS grille shutters to a more closed position and adjusting the active suspension from a more lowered position to a more raised position. Raising the active suspension can aid in reducing radiant heat transferred from the road surface to the AAT sensor, while closing the AGS grille shutters can reduce solar radiant heat transferred to the AAT sensor. At time $t_7$, controller 312 remeasures $ATT_{meas}$ and calculates $\Delta T$. In response to $\Delta T$ decreasing below $\Delta T_{TH}$ prior to the threshold time elapsing, controller 312 returns the active suspension to the more lowered level just prior to the start of the AAT sensor test at $t_4$. Similarly, in response to $\Delta T$ decreasing below $\Delta T_{TH}$ prior to the threshold time elapsing, controller 312 reopens the AGS grille shutters, and momentarily indicates a corrected AAT sensor status.

However, the control system 190, following routines external to the AAT sensor test, subsequently closes the AGS grille shutters shortly after time $t_7$ since the vehicle speed increases above the threshold vehicle speed, in order to reduce vehicle drag. Between time $t_7$ and time $t_8$, $AAT_{meas}$ tracks $AAT_{exp}$ closely such that $\Delta T$ remains less than $\Delta T_{TH}$. At time $t_8$, $AAT_{meas}$ suddenly increases, and $\Delta T$ becomes greater than $\Delta T_{TH}$. Responsive to $\Delta T > \Delta T_{TH}$ while the vehicle is ON, the controller initiates an AAT sensor test by adjusting the AGS grille position to a more open position for a threshold time 794. Responsive to the threshold time elapsing at time $t_9$, the controller 312 returns the AGS grille shutters to the more closed position, and remeasures $AAT_{meas}$ with the AAT sensor. Because the AAT sensor continues to indicate an excessively inflated $AAT_{meas}$ above $AAT_{exp}$ such that $\Delta T > \Delta T_{TH}$ after completion of the AAT sensor test, the AAT sensor may be malfunctioning, and controller 312 changes the AAT sensor status to faulty. During a condition with the AAT sensor status is faulty, the controller 312 may input $AAT_{exp}$ values to engine control and OBD routines in place of $AAT_{meas}$ until the AAT sensor is repaired or replaced and the AAT sensor status is returned to functional. As such, interruption of the vehicle drivability and operation during AAT sensor testing and while the AAT sensor is faulty can be reduced, thereby increasing operator satisfaction, and mitigating fuel emissions and fuel consumption.

Turning now to the timeline 800 of FIG. 8, prior to time $t_{11}$, the vehicle status is OFF and the vehicle speed is less than the threshold vehicle speed 716. As an example, the vehicle may be parked with the AAT sensor oriented more towards incident solar radiation (890), awaiting a scheduled trip start at time $t_{12}$. Furthermore, the AGS grille shutters are open to allow ambient air to circulate under hood, the side mirror is retracted to reduce obtrusiveness, and the AAT sensor is functional. As previously described, the $AAT_{exp}$ may be received and/or determined from various external data sources such as real-time crowd vehicle data, weather cloud data, and the like. $AAT_{meas}$ 730, as determined by the AAT sensor 220, is shown to decrease steadily relative to $AAT_{exp}$ prior to $t_{11}$. As examples, $AAT_{meas}$ may decrease relative to $AAT_{exp}$ because of precipitation contacting the AAT sensor. For instance, cold rain may fall on the AAT sensor, snow may fall on the AAT sensor, and precipitation may melt and or evaporate at the surface of the AAT sensor thereby cooling the AAT sensor, and the like. As such, the $AAT_{meas}$ is depressed relative to the $AAT_{exp}$, which can lead to reduced vehicle drivability, and increased fuel consumption and vehicle emissions if the depressed $AAT_{meas}$ is indicated to engine controls and OBD routines as the actual AAT. Just prior to time $t_{11}$, $AAT_{meas} - AAT_{exp}$ ($\Delta T$ 750) exceeds the threshold temperature difference, $\Delta T_{TH}$ 756.

As examples, the scheduled trip start at time $t_{12}$ may correspond to a home to work commute trip, a daily home to school route, a scheduled weekend errand trip, and the like. Time $t_{11}$ corresponds to a time occurring within a threshold pre-trip duration 722 prior to the scheduled trip at $t_{12}$. Responsive to the start of the pre-trip duration 722, and responsive to $\Delta T > \Delta T_{TH}$, the AAT sensor test is conducted, according to methods 500, 600, and 602. Accordingly, after determining that $AAT_{meas} < AAT_{exp}$, controller 312 adjusts one or more vehicle actuators to reduce the deviation of $AAT_{meas}$ from $AAT_{exp}$. For example, at time $t_{11}$ controller 312 adjusts the AGS grille shutters from a more open position to a more closed position in order to block or insulate the AAT sensor from the cooling source or the precipitation. As another example, at time $t_{11}$, controller 312 adjusts the side mirror from a more retracted position to a more extended position. As such, $\Delta T$ decreases below $\Delta T_{TH}$ 756 between $t_{11}$ and $t_{12}$ such that the $AAT_{meas}$ is much closer to $AAT_{exp}$ (and the actual AAT) prior to the start of the scheduled trip at time $t_{12}$. In response to the $\Delta T$ decreasing below $\Delta T_{TH}$, and/or in response to a threshold time 794 elapsing following switching of cooling fan ON, at time $t_{12}$ the controller 312 returns the AGS grille shutter position to a more closed state, returns the side mirror from a more extended position to a more retracted position, and remeasures AAT with the AAT sensor. Because the remeasured $AAT_{meas}$ deviates from $AAT_{exp}$ less than $\Delta T_{TH}$, controller 312 momentarily sets the AAT sensor status 796 to corrected. The corrected sensor status may be communicated to a vehicle operator by way of the instrument panel 196. Thus, by conducting the pre-trip AAT sensor test during the pre-trip duration, the excessively depressed AAT sensor measurement is corrected by reducing precipitation contacting the AAT sensor, thereby maintaining/increasing vehicle drivability, and reducing vehicle emissions and fuel consumption during the impending vehicle trip starting at $t_{12}$.

At time $t_{12}$, the vehicle status switches ON and the vehicle speed increases, but remains below the threshold speed during the scheduled trip. Shortly after time $t_{12}$ at time $t_{12a}$, the scheduled trip ends, the vehicle status is switched OFF, the vehicle speed decreases to 0, and the vehicle is parked. Between time $t_{12a}$ and time $t_{13}$, the sun emerges from the clouds, and the vehicle is positioned such that the AAT sensor is oriented more towards the incident solar radiation from the sun (890). As such, the solar radiant heat begins to warm the AAT sensor and $AAT_{meas}$ begins to increase relative to $AAT_{exp}$. As such $\Delta T$ begins to increase such that $\Delta T$ increases above $\Delta T_{TH}$ prior to time $t_{13}$. Time $t_{13}$ corresponds to a pre-trip condition, being during a pre-trip duration 722. Responsive to the pre-trip condition being satisfied and to $\Delta T > \Delta T_{TH}$ while the AAT sensor is positioned facing more towards the incident solar radiation, controller 312 determines if repositioning the vehicle is lawful (896). Repositioning the vehicle may be lawful when the vehicle may be reparked in an available parking space lawfully such that the AAT sensor may be positioned facing more away from the incident solar radiation. Because the vehicle may be repositioned lawfully, between time $t_{13}$ and time $t_{14}$, the vehicle is reparked. While reparking, the vehicle status is briefly switched ON, the vehicle speed briefly increases. After the vehicle has been repositioned the AAT sensor is facing more away from the sun (890), and $AAT_{meas}$ begins to decrease relative to $AAT_{exp}$. Prior to time $t_{14}$, $\Delta T$ decreases below $\Delta T_{TH}$, at which time the controller 312 adjusts the AAT sensor status 796 momentarily to corrected, indicating to the vehicle operator that the AAT sensor test has been completed and the deviating AAT sensor temperature has been adjusted.

Next, at time $t_{14}$, another scheduled vehicle trip is begun, the vehicle status is switched ON and the vehicle speed increases above the threshold vehicle speed. During the scheduled trip, while the vehicle speed is greater than the threshold vehicle speed, the AGS grille shutters are adjusted to a more open position in order to circulate ambient air to the radiator and under hood devices. As such, the AAT sensor is cooled and $AAT_{meas}$ does not deviate from $AAT_{exp}$ by more than $\Delta T_{TH}$. At time $t_{15}$, the scheduled vehicle trip ends, the vehicle speed decreases to 0, the AGS grille shutters are reopened, and the vehicle status is switched OFF. Once again, the vehicle is parked with the AAT sensor facing more towards the sun. As such, $AAT_{meas}$ begins to rise relative to $AAT_{exp}$ such that at $t_{16}$, $AAT_{meas}$ deviates positively from $AAT_{exp}$ by more than $\Delta T_{TH}$. At $t_{16}$, a pre-trip condition is satisfied since time $t_{16}$ is within a pre-trip duration 722 prior to a scheduled trip at $t_{17}$. Responsive to the pre-trip condition being satisfied and to $\Delta T>\Delta T_{TH}$ while the AAT sensor is positioned facing more towards the incident solar radiation, controller 312 determines if repositioning the vehicle is lawful (896). At time $t_{16}$, controller 312 determines that repositioning the vehicle is unlawful, for example, because the vehicle is parked on a one-way street and no shaded or covered legal parking spaces are available nearby. Responsive to the pre-trip condition being satisfied and to $\Delta T>\Delta T_{TH}$ while the AAT sensor is positioned facing more towards the incident solar radiation during a condition when the vehicle may not be lawfully repositioned, controller 312 adjusts the AGS grille shutter to a more closed position and adjusts the side mirror to a more retracted position. In this way the $AAT_{meas}$ at an AAT sensor positioned between the AGS system and the radiator and the $AAT_{meas}$ at an AAT sensor positioned at an underside of the side mirror can be reduced relative to $AAT_{exp}$. In the example of timeline 800, AAT sensors may be positioned at both the side mirror and under hood. In other examples, an AAT sensor may be positioned at one of the side mirror and under hood between the AGS system and the radiator; for such a case, controller 312 may adjust one of the side mirror position and the AGS grille shutter position, respectively, at time $t_{16}$, to insulate the AAT sensor from solar radiation and reduce the deviation of $AAT_{meas}$ from $AAT_{exp}$. Prior to the start of the next scheduled trip at time $t_{17}$, $\Delta T$ is reduced below $\Delta T_{TH}$ and controller 312 responsively returns the AGS position to a more open position and returns the side mirror to a more extended position. Furthermore, controller 312 momentarily adjusts the AAT sensor status to corrected. At time $t_{17}$, the scheduled trip begins, and the $AAT_{meas}$ deviates from $AAT_{exp}$ by less than $\Delta T_{TH}$, thereby reducing vehicle emissions, fuel consumption, and increasing vehicle drivability.

The technical effect of implementing the methods and systems herein, including conducting an AAT sensor test responsive to a measured AAT at the AAT sensor deviating from an expected AAT greater than a threshold temperature difference, is to reduce a temperature deviation of a measure AAT at an AAT sensor from an expected AAT to increase an accuracy and reliability of the AAT sensor measurement. For example, by adjusting a vehicle actuator such as adjusting AGS grille shutters from a more closed position to a more open position (and other examples of adjusting vehicle actuators described herein), ambient air can be increasingly circulated at the AAT sensor to insulate the AAT sensor from radiant heat transferred thereto from the engine, road surface, energy storage device, and the like. As another example, by adjusting a vehicle actuator such as adjusting AGS grille shutters from a more closed position to a more open position (and other examples of adjusting vehicle actuators described herein), precipitation contacting an AAT sensor surface can be reduced (thereby insulating the AAT sensor from the precipitation). As such, an excessively inflated or depressed AAT measurements at the AAT sensor relative to an expected AAT can be corrected and the reliability of engine control and OBD routines depending at least partially on the AAT sensor measurement can be maintained, thereby reducing fuel consumption and emissions while maintaining or increasing vehicle drivability. An additional technical effect of conducting an AAT sensor test responsive to the AAT sensor deviating from an expected AAT greater than a threshold temperature difference is to enable determination of a faulty AAT sensor with increased accuracy. In particular, because an excessively inflated or depressed AAT measurement can be expediently corrected by adjusting vehicle actuators to remove radiant heat transferred to the AAT sensor or precipitation contacting the AAT sensor, respectively, faulty AAT sensor behavior can be more robustly evaluated. An additional technical effect of conducting an AAT sensor test responsive to the AAT sensor deviating from an expected AAT greater than a threshold temperature difference is that the accuracy of an AAT measurement displayed at key up or when a vehicle status is switched ON can be increased.

The systems described herein and with reference to FIGS. 1-3, 4A, and 4B, along with the methods described herein and with reference to FIGS. 5, 6A, and 6B, and the timelines with reference to FIGS. 7 and 8, may enable one or more systems and one or more methods. In one example, a method for a vehicle including an ambient air temperature (AAT) sensor may include in response to an AAT measured by the AAT sensor deviating from an expected AAT by more than a threshold temperature difference, adjusting a vehicle actuator to reduce the deviation of the AAT measured by the AAT sensor from the expected AAT. In a first example of the method, the method further includes remeasuring the AAT with the AAT sensor after adjusting the vehicle actuator. A second example of the method optionally includes the first example and further comprises indicating a corrected AAT sensor when the remeasured AAT deviates from the expected AAT by less than the threshold temperature difference. A third example of the method optionally includes any one or more or each of the first and second examples and further comprises wherein remeasuring the AAT with the AAT sensor comprises remeasuring the AAT after a threshold time has elapsed after adjusting the vehicle actuator. A fourth example of the method optionally includes any one or more or each of the first through third examples and further comprises wherein adjusting the vehicle actuator includes changing an active grille shutter (AGS) position by more than a threshold position change prior to elapsing of the threshold time. A fifth example of the method optionally includes any one or more or each of the first through fourth examples and further comprises wherein adjusting the vehicle actuator includes extending a side mirror with a mounted AAT sensor thereon prior to elapsing of the threshold time. A sixth example of the method optionally includes any one or more or each of the first through fifth examples and further comprises wherein adjusting the vehicle actuator includes elevating an active suspension of the vehicle.

Another example method may include performing a temperature sensor test during a first condition when a temperature difference between an ambient air temperature (AAT) measured by a temperature sensor on board a vehicle and an expected AAT increases beyond a threshold temperature difference. In one example, the method may include wherein performing the temperature sensor test includes, increasing insulation of the temperature sensor from radiant heat transferred thereto by adjusting a vehicle actuator from a first state to a second state, and remeasuring the AAT with the AAT sensor after adjusting the vehicle actuator to the second state. A second example of the method optionally includes the first example and further comprises wherein the first condition further comprises when the vehicle is ON, the method further comprising performing the temperature sensor test during a second condition, the second condition comprising when the vehicle is OFF, and when the temperature difference between the AAT measured by the temperature sensor on board the vehicle and the expected AAT increases beyond the threshold temperature difference. In one example, the second condition may optionally further include when a pre-trip condition is satisfied while the vehicle is OFF. A third example of the method optionally includes any one or more or each of the first and second examples and further comprises indicating a faulty AAT sensor when the remeasured AAT deviates from the expected AAT by more than the threshold temperature difference. A fourth example of the method optionally includes any one or more or each of the first through third examples and further comprises sustaining the vehicle actuator in the second state for a threshold time, and returning the adjusted vehicle actuator from the second state to the first state after the threshold time. A fifth example of the method optionally includes any one or more or each of the first through fourth examples and further comprises returning the vehicle actuator from the second state to the first state when the remeasured AAT deviates from the expected AAT by less than the threshold temperature difference. A sixth example of the method optionally includes any one or more or each of the first through fifth examples and further comprises wherein remeasuring the AAT with the AAT sensor after adjusting the vehicle actuator to the second state includes remeasuring the AAT after the threshold time. A seventh example of the method optionally includes any one or more or each of the first through sixth examples and further comprises wherein adjusting the vehicle actuator includes adjusting an active grille shutter (AGS), the first state comprises a more closed position, and the second state comprises a more open position. An eighth example of the method optionally includes any one or more or each of the first through seventh examples and further comprises wherein adjusting the vehicle actuator from the first state to the second state includes adjusting an AGS from a more open position to a more closed position.

In another example, a vehicle system may include an ambient air temperature (AAT) sensor, and a controller on board the vehicle with executable instructions stored in non-transitory memory thereon, the executable instructions including: in response to an AAT measured by the AAT sensor deviating from an expected AAT by more than a threshold temperature difference, adjusting one or more vehicle actuators to reduce the deviation of the AAT measured by the AAT sensor from the expected AAT. In another example, the executable instructions may optionally further include remeasuring the AAT with the AAT sensor after adjusting the vehicle actuator. A second example of the vehicle system optionally includes the first example and may further comprise wherein the vehicle system comprises an autonomous vehicle, and wherein the executable instructions further include during a first condition including when the vehicle is OFF, adjusting the one or more vehicle actuators to reduce the deviation of the AAT measured by the AAT sensor from the expected AAT comprises repositioning the AV to orient the AAT sensor more away from solar radiation. A third example of the vehicle system optionally includes any one or more or each of the first and second examples and may further comprise wherein the executable instructions further include, wherein the first condition includes during a pre-trip condition, and adjusting the one or more vehicle actuators to reduce the deviation of the AAT measured by the AAT sensor from the expected AAT further comprises repositioning the AV to orient the AAT sensor more away from solar radiation, including disengaging a parking gear. A fourth example of the vehicle system optionally includes any one or more or each of the first through third examples and further comprises wherein the executable instructions further include wherein during a second condition when repositioning the AV to orient the AAT sensor more away from solar radiation would be unlawful, adjusting the one or more vehicle actuators includes adjusting a side mirror from a more retracted position to a more extended position. A fifth example of the vehicle system optionally includes any one or more or each of the first through fourth examples and further comprises wherein the executable instructions further include, wherein during the second condition, adjusting the one or more vehicle actuators includes adjusting an AGS grille shutter position from a more open position to a more closed position. A sixth example of the vehicle system optionally includes any one or more or each of the first through fifth examples and further comprises wherein the executable instructions further include, wherein during the second condition, adjusting the one or more vehicle actuators includes switching a cooling fan ON while the AGS grille shutter position is at least partially open.

In another representation, a method for a vehicle including an ambient air temperature (AAT) sensor may include in response to an AAT measured by the AAT sensor deviating from an expected AAT by more than a threshold temperature difference, adjusting a vehicle actuator to reduce the deviation of the AAT measured by the AAT sensor from the expected AAT, during a cooling condition when the AAT measured by the AAT sensor deviates negatively from the expected AAT by more than the threshold temperature difference. A second example method, optionally includes the first representation and may further comprise during the cooling condition, adjusting a side mirror from a more retracted position to a more extended position when an AAT sensor is mounted at an underside of the side mirror. A third example method, optionally includes the first and second examples and may further comprise during the cooling condition, adjusting an AGS grille shutter from a more open position to a more closed position when an AAT sensor is mounted at an under hood position between the AGS grille shutter and a radiator.

In another representation, a vehicle system may include an ambient air temperature (AAT) sensor, and a controller on board the vehicle with executable instructions stored in non-transitory memory thereon, the executable instructions including: in response to an AAT measured by the AAT sensor deviating from an expected AAT by more than a threshold temperature difference, adjusting a vehicle actuator to reduce radiant heat transferred to the AAT sensor. In another example, the executable instructions may optionally further include remeasuring the AAT with the AAT sensor after adjusting the vehicle actuator. A second example of the vehicle system optionally includes the first example and may further comprise wherein the executable instructions further include adjusting the vehicle actuator to reduce radiant heat transferred to the AAT sensor, wherein responsive to a vehicle speed being greater than a threshold speed, adjusting the vehicle actuator includes changing an active grille shutter (AGS) position from a more closed position to a more open position. A third example of the vehicle system optionally includes any one or more or each of the first and second examples and may further comprise wherein the executable instructions further include adjusting the vehicle actuator to reduce radiant heat transferred to the AAT sensor, wherein responsive to the vehicle speed being less than the threshold speed, adjusting the vehicle actuator includes changing the AGS position from a more open position to a more closed position. A fourth example of the vehicle system optionally includes any one or more or each of the first through third examples and further comprises wherein the executable instructions further include responsive to the vehicle speed being less than the threshold speed, adjusting the vehicle actuator includes changing the AGS position from a more open position to a more closed position wherein changing the AGS position includes only changing the AGS position of an AGS group positioned anteriorly to the AAT, while maintaining the positions of other AGS groups. A fifth example of the vehicle system optionally includes any one or more or each of the first through fourth examples and further comprises wherein the executable instructions further include adjusting the vehicle actuator to reduce radiant heat transferred to the AAT sensor, wherein responsive to the vehicle speed being less than the threshold speed, adjusting the vehicle actuator includes raising a vehicle suspension from a more lowered position to a more raised position. A sixth example of the vehicle system optionally includes any one or more or each of the first through fifth examples and further comprises wherein the executable instructions further include adjusting the vehicle actuator to reduce radiant heat transferred to the AAT sensor, wherein responsive to the vehicle being OFF, adjusting the vehicle actuator includes switching an engine cooling fan from an OFF state to an ON state.

In another representation, a method for a vehicle may comprise, responsive to a temperature difference between an ambient air temperature (AAT) measured by a temperature sensor on board a vehicle and an expected AAT increasing beyond a threshold temperature difference, opening the AGS grille shutters and parking the vehicle wherein the opened AGS grille shutters face a windward direction. In this way, convection of ambient air circulation of to the AAT sensor by the wind is increased, thereby reducing radiant heat transferred to the AAT sensor. Furthermore, the wind-induced increased ambient air convection to the under hood devices can aid cooling the vehicle fuel system, thereby stimulating vacuum generation. As a such, a technical result of opening the AGS grille shutters and parking the vehicle wherein the opened AGS grille shutters face a windward direction responsive to a temperature difference between an ambient air temperature (AAT) measured by a temperature sensor on board a vehicle and an expected AAT increasing beyond a threshold temperature difference is that fuel and engine cooling may be expedited, vehicle in-use monitoring performance (JUMP) rates for fuel system EVAP testing and other OBD diagnostics can be increased, while increasing reliability and accuracy of AAT sensor measurements by reducing excessive radiant heat transferred thereto. As such, adjusting a vehicle actuator to reduce radiant heat at the AAT sensor responsive to a temperature difference between an ambient air temperature (AAT) measured by a temperature sensor on board a vehicle and an expected AAT increasing beyond a threshold temperature difference, may include opening the AGS grille shutters and parking the vehicle wherein the opened AGS grille shutters face a windward direction.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle including an ambient air temperature (AAT) sensor, the method comprising:
   in response to an AAT measured by the AAT sensor deviating from an expected AAT by more than a threshold temperature difference;
   adjusting a vehicle actuator to reduce the deviation of the AAT measured by the AAT sensor from the expected AAT, wherein adjusting the vehicle actuator includes changing an active grille shutter (AGS) position by more than a threshold position change prior to elapsing of a threshold time;
   remeasuring the AAT with the AAT sensor after adjusting the vehicle actuator, wherein remeasuring the AAT with the AAT sensor comprises remeasuring the AAT after the threshold time has elapsed after adjusting the vehicle actuator; and
   indicating a corrected AAT sensor when the remeasured AAT deviates from the expected AAT by less than the threshold temperature difference.

2. The method of claim 1, wherein adjusting the vehicle actuator includes extending a side mirror with a mounted AAT sensor thereon prior to elapsing of the threshold time.

3. The method of claim 1, wherein adjusting the vehicle actuator includes elevating an active suspension of the vehicle prior to elapsing of the threshold time.

4. A method, comprising:
performing a temperature sensor test during a first condition when a temperature difference between an ambient air temperature (AAT) measured by a temperature sensor on board a vehicle and an expected AAT increases beyond a threshold temperature difference, wherein performing the temperature sensor test includes;
increasing insulation of the temperature sensor from radiant heat transferred thereto by adjusting a vehicle actuator from a first state to a second state; and
remeasuring the AAT with the temperature sensor after adjusting the vehicle actuator to the second state.

5. The method of claim 4, wherein the first condition further comprises when the vehicle is ON, the method further comprising performing the temperature sensor test during a second condition, the second condition comprising:
when the vehicle is OFF;
when a pre-trip condition is satisfied; and
when the temperature difference between the AAT measured by the temperature sensor on board the vehicle and the expected AAT increases beyond the threshold temperature difference.

6. The method of claim 4, further comprising indicating a faulty temperature sensor when the remeasured AAT deviates from the expected AAT by more than the threshold temperature difference.

7. The method of claim 6, further comprising, sustaining the vehicle actuator in the second state for a threshold time, and returning the adjusted vehicle actuator from the second state to the first state after the threshold time.

8. The method of claim 7, further comprising returning the vehicle actuator from the second state to the first state when the remeasured AAT deviates from the expected AAT by less than the threshold temperature difference.

9. The method of claim 8, wherein remeasuring the AAT with the temperature sensor after adjusting the vehicle actuator to the second state includes remeasuring the AAT after the threshold time.

10. The method of claim 9, wherein adjusting the vehicle actuator includes adjusting an active grille shutter (AGS), the first state comprises a more closed position, and the second state comprises a more open position.

11. The method of claim 8, wherein adjusting the vehicle actuator from the first state to the second state includes adjusting an AGS from a more open position to a more closed position.

12. A vehicle system including an ambient air temperature (AAT) sensor, and a controller on board a vehicle with executable instructions stored in non-transitory memory thereon, wherein the vehicle system comprises an autonomous vehicle (AV), and wherein the executable instructions include:
in response to an AAT measured by the AAT sensor deviating from an expected AAT by more than a threshold temperature difference;
adjusting one or more vehicle actuators to reduce the deviation of the AAT measured by the AAT sensor from the expected AAT; and
remeasuring the AAT with the AAT sensor after adjusting the vehicle actuator,
wherein during a first condition including when the vehicle is OFF, adjusting the one or more vehicle actuators to reduce the deviation of the AAT measured by the AAT sensor from the expected AAT comprises repositioning the AV to orient the AAT sensor more away from solar radiation.

13. The vehicle system of claim 12, wherein the executable instructions further comprise, wherein the first condition includes during a pre-trip condition, and adjusting the one or more vehicle actuators to reduce the deviation of the AAT measured by the AAT sensor from the expected AAT during the first condition further comprises repositioning the AV to orient the AAT sensor more away from solar radiation, including disengaging a parking gear.

14. The vehicle system of claim 13, wherein the executable instructions further comprise during a second condition comprising when repositioning the AV to orient the AAT sensor more away from solar radiation would be unlawful, adjusting the one or more vehicle actuators including adjusting a side mirror from a more retracted position to a more extended position.

15. The vehicle system of claim 14, wherein the executable instructions further comprise, during the second condition, adjusting the one or more vehicle actuators including adjusting an AGS grille shutter position from a more open position to a more closed position.

16. The vehicle system of claim 15, wherein the executable instructions further comprise during the second condition, adjusting the one or more vehicle actuators including switching a cooling fan ON while the AGS grille shutter position is at least partially open.

* * * * *